US012236825B2

(12) United States Patent
Cok et al.

(10) Patent No.: US 12,236,825 B2
(45) Date of Patent: Feb. 25, 2025

(54) REDUNDANT PIXEL LAYOUTS

(71) Applicant: X Display Company Technology Limited, Dublin (IE)

(72) Inventors: Ronald S. Cok, Rochester, NY (US); Erich Radauscher, Raleigh, NC (US); Erik Paul Vick, Raleigh, NC (US); Andrew Tyler Pearson, Durham, NC (US); Christopher Andrew Bower, Raleigh, NC (US); Matthew Alexander Meitl, Durham, NC (US)

(73) Assignee: X Display Company Technology Limited, Dublin (IE)

( * ) Notice: Subject to any disclaimer, the term of this patent is extended or adjusted under 35 U.S.C. 154(b) by 388 days.

(21) Appl. No.: 16/101,717

(22) Filed: Aug. 13, 2018

(65) Prior Publication Data

US 2020/0051482 A1 Feb. 13, 2020

(51) Int. Cl.
*G09G 3/20* (2006.01)
*G09G 3/32* (2016.01)

(52) U.S. Cl.
CPC ............. *G09G 3/2003* (2013.01); *G09G 3/32* (2013.01); *G09G 2300/0452* (2013.01)

(58) Field of Classification Search
CPC ........ G09G 3/32; G09G 3/22; G09G 2330/08; G09G 2300/0408; G09G 2300/0439;
(Continued)

(56) References Cited

U.S. PATENT DOCUMENTS 3,709,589 A 1/1973 Lamb et al.
5,550,066 A 8/1996 Tang et al.
(Continued)

FOREIGN PATENT DOCUMENTS

WO WO-2010/132552 A1 11/2010
WO WO-2014/149864 A1 9/2014
(Continued)

OTHER PUBLICATIONS

Bower, C. A. et al., Micro-Transfer-Printing: Heterogeneous Integration of Microscale Semiconductor Devises using Elastomer Stamps, IEEE Conference, (2014).
(Continued)

*Primary Examiner* — William Boddie
*Assistant Examiner* — Alecia D English
(74) *Attorney, Agent, or Firm* — Choate, Hall & Stewart LLP; Michael D. Schmitt

(57) ABSTRACT

A redundant pixel layout for a display comprises a display substrate and an array of pixels disposed on or over the display substrate. Each pixel comprises a first subpixel and a redundant second subpixel. The first subpixel includes a first subpixel controller electrically connected to controller wires and a first light emitter electrically connected to a first-light-emitter wire. The first light emitter is controlled by the first subpixel controller through the first-light-emitter wire. The second subpixel includes a second-subpixel-controller location connected to the controller wires and a second-light-emitter location comprising a second-light-emitter wire. The first light emitter is adjacent to the second-light-emitter location and the first light emitter and the second-light-emitter location are closer together than are any two pixels in the array of pixels.

23 Claims, 17 Drawing Sheets

(58) Field of Classification Search
CPC ......... G09G 2300/0452; G09G 3/3233; G09G 2300/0443; G09G 2330/10; H01L 27/3246; H01L 27/3211; H01L 25/167
See application file for complete search history.

(56) References Cited

U.S. PATENT DOCUMENTS 5,621,555 A 4/1997 Park
6,084,579 A 7/2000 Hirano
6,184,477 B1 2/2001 Tanahashi
6,403,985 B1 6/2002 Fan et al.
6,518,945 B1 * 2/2003 Pinkham .............. G09G 3/3659 345/98
6,717,560 B2 4/2004 Cok et al.
6,756,576 B1 6/2004 McElroy et al.
6,825,559 B2 11/2004 Mishra et al.
7,417,648 B2 8/2008 Credelle
7,586,497 B2 9/2009 Boroson et al.
7,622,367 B1 11/2009 Nuzzo et al.
7,629,955 B2 12/2009 Asao et al.
7,687,812 B2 3/2010 Louwsma et al.
7,872,722 B2 1/2011 Kimura
7,932,123 B2 4/2011 Rogers et al.
7,943,491 B2 5/2011 Nuzzo et al.
7,982,296 B2 7/2011 Nuzzo et al.
7,999,454 B2 8/2011 Winters et al.
8,305,294 B2 11/2012 Cok et al.
8,333,860 B1 12/2012 Bibl et al.
8,506,867 B2 8/2013 Menard
8,558,243 B2 10/2013 Bibl et al.
8,619,011 B2 12/2013 Kimura
8,722,458 B2 5/2014 Rogers et al.
8,791,474 B1 7/2014 Bibl et al.
8,794,501 B2 8/2014 Bibl et al.
8,803,857 B2 8/2014 Cok
8,835,940 B2 9/2014 Hu et al.
8,865,489 B2 10/2014 Rogers et al.
8,884,844 B2 11/2014 Yang et al.
8,889,485 B2 11/2014 Bower
8,896,505 B2 11/2014 Cok et al.
8,934,259 B2 1/2015 Bower et al.
8,941,215 B2 1/2015 Hu et al.
8,987,765 B2 3/2015 Bibl et al.
9,105,714 B2 8/2015 Hu et al.
9,111,464 B2 8/2015 Bibl et al.
9,153,171 B2 * 10/2015 Sakariya .............. G09G 3/3266
9,161,448 B2 10/2015 Menard et al.
9,166,114 B2 10/2015 Hu et al.
9,217,541 B2 12/2015 Bathurst et al.
9,240,397 B2 1/2016 Bibl et al.
9,244,282 B2 1/2016 Etienne et al.
9,252,375 B2 2/2016 Bibl et al.
9,367,094 B2 6/2016 Bibl et al.
9,412,727 B2 8/2016 Menard et al.
9,437,782 B2 9/2016 Bower et al.
9,444,015 B2 9/2016 Bower et al.
9,478,583 B2 10/2016 Hu et al.
9,484,504 B2 11/2016 Bibl et al.
9,520,537 B2 12/2016 Bower et al.
9,555,644 B2 1/2017 Rogers et al.
9,583,533 B2 2/2017 Hu et al.
9,589,944 B2 3/2017 Higginson et al.
9,626,908 B2 4/2017 Sakariya et al.
9,698,308 B2 7/2017 Bower et al.
9,705,042 B2 7/2017 Bower et al.
9,765,934 B2 9/2017 Rogers et al.
9,860,955 B2 1/2018 Kim et al.
9,865,832 B2 1/2018 Bibl et al.
10,910,355 B2 2/2021 Cok et al.
11,189,605 B2 11/2021 Bower et al.
2002/0075440 A1 6/2002 Deane
2002/0096994 A1 7/2002 Iwafuchi et al.
2002/0175882 A1 11/2002 Edwards et al.
2003/0117369 A1 6/2003 Spitzer et al.
2005/0264472 A1 12/2005 Rast
2006/0063309 A1 3/2006 Sugiyama et al.
2007/0035340 A1 2/2007 Kimura
2007/0040770 A1 2/2007 Kim
2008/0012794 A1 1/2008 Battersby
2008/0018583 A1 1/2008 Knapp et al.
2008/0266214 A1 10/2008 Naugler et al.
2008/0303756 A1 12/2008 Smith
2009/0250690 A1 10/2009 Shin et al.
2010/0123694 A1 5/2010 Cok et al.
2010/0186883 A1 7/2010 Tomoda
2010/0214247 A1 8/2010 Tang et al.
2010/0309100 A1 * 12/2010 Cok ..................... G09G 3/3208 345/76
2011/0032277 A1 2/2011 Lee et al.
2011/0073864 A1 3/2011 Liu et al.
2011/0242027 A1 10/2011 Chang
2012/0062135 A1 3/2012 Tamaki et al.
2012/0075271 A1 * 3/2012 Snijder .................... G09G 3/32 345/204
2012/0126233 A1 5/2012 Chang et al.
2012/0206428 A1 8/2012 Cok
2012/0206499 A1 8/2012 Cok
2012/0223875 A1 9/2012 Lau et al.
2013/0088416 A1 4/2013 Smith et al.
2013/0273695 A1 10/2013 Menard et al.
2014/0082934 A1 3/2014 Cok
2014/0085214 A1 3/2014 Cok
2014/0111442 A1 4/2014 Cok et al.
2014/0131715 A1 5/2014 Liu et al.
2014/0159043 A1 6/2014 Sakariya et al.
2014/0240617 A1 8/2014 Fukutome et al.
2014/0267683 A1 9/2014 Bibl et al.
2014/0319486 A1 10/2014 Hong
2015/0135525 A1 5/2015 Bower
2015/0169011 A1 * 6/2015 Bibl .................... H01L 31/0216 345/175
2015/0296580 A1 10/2015 Kim et al.
2015/0359065 A1 12/2015 Park et al.
2015/0362165 A1 12/2015 Chu et al.
2015/0371585 A1 12/2015 Bower et al.
2015/0371974 A1 12/2015 Bower et al.
2015/0372051 A1 12/2015 Bower et al.
2015/0372052 A1 12/2015 Bower et al.
2015/0372053 A1 12/2015 Bower et al.
2015/0373793 A1 12/2015 Bower et al.
2016/0005721 A1 1/2016 Bower et al.
2016/0018094 A1 1/2016 Bower et al.
2016/0057822 A1 2/2016 Chu
2016/0057832 A1 2/2016 Briggs et al.
2016/0093600 A1 3/2016 Bower et al.
2016/0133174 A1 * 5/2016 Jeong ....................... G09G 5/06 345/693
2016/0266697 A1 9/2016 Cheng et al.
2016/0290600 A1 10/2016 Biederman et al.
2016/0300900 A1 10/2016 Miyake
2016/0343771 A1 * 11/2016 Bower .................... H01L 21/77
2016/0343772 A1 11/2016 Bower et al.
2017/0025075 A1 1/2017 Cok et al.
2017/0032735 A1 2/2017 Lee et al.
2017/0048976 A1 2/2017 Prevatte et al.
2017/0061842 A1 * 3/2017 Cok ..................... G09G 3/2003
2017/0068362 A1 3/2017 Den Boer et al.
2017/0102797 A1 4/2017 Cok
2017/0167703 A1 6/2017 Cok
2017/0177105 A1 6/2017 Wu et al.
2017/0186740 A1 6/2017 Cok et al.
2017/0187976 A1 6/2017 Cok
2017/0206845 A1 7/2017 Sakariya et al.
2017/0256521 A1 9/2017 Cok et al.
2017/0256522 A1 9/2017 Cok et al.
2017/0287992 A1 10/2017 Kwak et al.
2017/0309688 A1 10/2017 Lee et al.
2017/0338374 A1 11/2017 Zou et al.
2017/0357127 A1 12/2017 Cok et al.
2017/0358562 A1 * 12/2017 Banna ................. H01L 25/0753
2018/0033853 A1 2/2018 Bower et al.
2018/0122298 A1 5/2018 Lee et al.
2018/0182294 A1 * 6/2018 Radhakrishnan .... G09G 3/3241
2018/0199402 A1 7/2018 Henninger

(56) References Cited

U.S. PATENT DOCUMENTS

| | | | |
|---|---|---|---|
| 2018/0247586 A1* | 8/2018 | Vahid Far | G09G 3/2003 |
| 2018/0301472 A1 | 10/2018 | Matsukizono | |
| 2019/0043917 A1* | 2/2019 | Hughes | H01L 22/14 |
| 2019/0115407 A1 | 4/2019 | Cho et al. | |
| 2019/0163304 A1 | 5/2019 | Shim et al. | |
| 2019/0265478 A1 | 8/2019 | Cok et al. | |
| 2019/0267363 A1 | 8/2019 | Bower et al. | |
| 2021/0111169 A1 | 4/2021 | Cok et al. | |
| 2021/0384290 A1 | 12/2021 | Bower et al. | |

FOREIGN PATENT DOCUMENTS

| | | |
|---|---|---|
| WO | WO-2015/193434 A2 | 12/2015 |
| WO | WO-2016/030422 A1 | 3/2016 |
| WO | WO-2017/060487 A2 | 4/2017 |
| WO | WO-2017/149067 A1 | 9/2017 |

OTHER PUBLICATIONS

Bower, C. A. et al., Transfer Printing: An Approach for Massively Parallel Assembly of Microscale Devices, IEEE, Electronic Components and Technology Conference, (2008).

Cok, R. S. et al., 60.3: AMOLED Displays Using Transfer-Printed Integrated Circuits, Society for Information Display, 10:902-904, (2010).

Feng, X. et al., Competing Fracture in Kinetically Controlled Transfer Printing, Langmuir, 23(25):12555-12560, (2007).

Gent, A.N., Adhesion and Strength of Viscoelastic Solids. Is There a Relationship between Adhesion and Bulk Properties?, American Chemical Society, Langmuir, 12(19):4492-4496, (1996).

Kim, Dae-Hyeong et al., Optimized Structural Designs for Stretchable Silicon Integrated Circuits, Small, 5(24):2841-2847, (2009).

Kim, Dae-Hyeong et al., Stretchable and Foldable Silicon Integrated Circuits, Science, 320:507-511, (2008).

Kim, S. et al., Microstructural elastomeric surfaces with reversible adhesion and examples of their use in deterministic assembly by transfer printing, PNAS, 107(40):17095-17100 (2010).

Kim, T. et al., Kinetically controlled, adhesiveless transfer printing using microstructured stamps, Applied Physics Letters, 94(11):113502-1-113502-3, (2009).

Trindade, A.J. et al., Precision transfer printing of ultra-thin AlInGaN micron-size light-emitting diodes, Crown, pp. 217-218, (2012).

Cok, R. S. et al., AMOLED displays with transfer-printed integrated circuits, Journal of SID, 19(4):335-341 (2011).

Cok, R. S. et al., Inorganic light-emitting diode displays using micro-transfer printing, Journal of the SID, 25(10):589-609, (2017).

Hamer, J. W. et al., 63.2: AMOLED Displays Using Transfer-Printed Integrated Circuits, SID 09 DIGEST, 40(2):947-950 (2009).

Yoon, J. et al., Heterogeneously Integrated Optoelectronic Devices Enabled by Micro Transfer Printing, Adv. Optical Mater., 3:1313-1335 (2015).

* cited by examiner

REDUNDANT PIXEL LAYOUTS

FIELD

The present invention relates generally to pixel arrangements in flat-panel color displays, for example active-matrix micro-LED displays.

BACKGROUND

Flat-panel color displays comprise an array of pixels arranged in rows and columns over a display substrate. Each pixel in the array of pixels comprises one or more light emitters. In color displays, the pixels typically comprise three color light emitters: a red-light emitter, a green-light emitter, and a blue-light emitter. Each pixel in an active-matrix display includes a local control-and-storage circuit that receives data from a display controller (often comprising a row controller that provides row-control signals to each row of pixels and a column controller) that provides column-data signals to each column of pixels). Once the pixel data is stored in each pixel, the pixel controller controls the light emitter(s) in the pixel to output the pixel data independently of other pixels. In contrast, passive-matrix displays do not include a local control-and-storage circuit. Instead, rows of pixels are controlled at a time to emit light by external row and column controllers.

Conventional liquid crystal displays (LCDs) use a backlight to generate light that is controlled by liquid crystal. Organic light-emitting diode (OLED) displays comprise thin layers of organic material to emit light in response to a current passing through the organic material layers. An example of such an active-matrix OLED display device is disclosed in U.S. Pat. No. 5,550,066. In both LCD and OLED displays, the pixels are made as large as possible to increase brightness and lifetime for the displays. Displays using inorganic light-emitting diodes (ILEDs) are also known.

Typical flat-panel displays use thin-film electronic semiconductor materials (such as amorphous or polycrystalline silicon layers) coated on a display substrate to provide active-matrix control circuits for each pixel. The substrate and thin layer of semiconductor material can be photolithographically processed to define electronically active components, such as thin-film transistors. Transistors may also be formed in thin layers of organic materials. In these devices, the display substrate is often made of glass, for example Corning Eagle or Jade glass designed for display applications.

Another method for providing an array of control circuits on a substrate is described in U.S. Pat. No. 7,943,491. In an exemplary embodiment of this approach, small integrated circuits are formed on a semiconductor wafer. The small integrated circuits, or chiplets, are released from the wafer by etching a layer formed beneath the circuits. A PDMS stamp is pressed against the wafer and the process side of the chiplets is adhered to the stamp. The chiplets are pressed against a destination substrate or backplane and adhered to the destination substrate. In another example, U.S. Pat. No. 8,722,458 entitled Optical Systems Fabricated by Printing-Based Assembly teaches transferring light-emitting, light-sensing, or light-collecting semiconductor elements from a wafer substrate to a destination substrate or backplane.

In some cases, however, not all of the elements are transferred from the wafer to the destination substrate by the stamp, for example due to process or material abnormalities or undesired particles on the stamp, the wafer, or the destination substrate. It is also possible that the elements themselves are defective due to materials or manufacturing process errors in the source wafer. Such problems can reduce manufacturing yields, increase product costs, and necessitate expensive repair or rework operations.

There is a need, therefore, for matrix-addressed systems with small high-resolution elements and circuits that are tolerant of manufacturing and materials variability and particle contamination and enable repair.

SUMMARY

In one aspect, the present invention is directed to a redundant pixel layout for a display comprises a display substrate and an array of pixels disposed on or over the display substrate. Each pixel comprises a first subpixel and a redundant second subpixel. Each first subpixel comprises a first subpixel controller electrically connected to controller wires and a first light emitter electrically connected to a first-light-emitter wire. Each first light emitter is controlled by the first subpixel controller at least through the first-light-emitter wire. The second subpixel comprises a second-subpixel-controller location comprising electrical connections to the controller wires and a second-light-emitter location comprising a second-light-emitter wire. The first light emitter is adjacent to the second-light-emitter location and the first light emitter and the second-light-emitter location are closer together than are any two pixels in the array of pixels.

In some embodiments of the present invention, for at least one pixel in the array of pixels, the second subpixel of the pixel comprises a second subpixel controller electrically connected to the controller wires in the second-subpixel-controller location and a second light emitter electrically connected to the second-light-emitter wire in the second-light-emitter location. The second light emitter is controlled by the second subpixel controller at least through the second-light-emitter wire.

In some embodiments of the present invention, for the at least one pixel, the first subpixel controller has an area that is greater than an area of the first light emitter or the second subpixel controller has an area that is greater than an area of the second light emitter, or both.

In some embodiments of the present invention, for the at least one pixel, the first subpixel is faulty. In some embodiments of the present invention, for the at least one pixel, the second subpixel is faulty. In some embodiments of the present invention, for the at least one pixel, a controller wire, the first-light-emitter wire, the second-light-emitter wire, a power wire, or a ground wire in a pixel is cut. In some embodiments, the cut wire is in a faulty subpixel.

In embodiments of the present invention, for the at least one pixel, the first subpixel of each pixel comprises two or more first light emitters that each emit light of a different color from others of the first light emitters and the second subpixel of the at least one pixel comprises two or more second light emitters that each emit light of a different color from others of the second light emitters.

In embodiments of the present invention, for the at least one pixel, the first light emitters of the pixel are adjacent and the second light emitters are adjacent, the first light emitters and the second light emitters are disposed in a common line, the first light emitters are disposed in a first line and the second light emitters are disposed in a second line different from the first line, the first light emitters are adjacent to the second light emitters, or the first light emitters are interdigitated with the second light emitters in a line.

In some embodiments of the present invention, for the at least one pixel, the first subpixel comprises a red first light emitter that emits red light, a green first light emitter that emits green light, and a blue first light emitter that emits blue light, and the second subpixel comprises a red second light emitter that emits red light, a green second light emitter that emits green light, and a blue second light emitter that emits blue light. In some configurations, the red first light emitter is adjacent to the blue second light emitter, the green first light emitter is adjacent to the green second light emitter, and the blue first light emitter is adjacent to the red second light emitter. In some configurations, the red first light emitter is adjacent to the red second light emitter, the green first light emitter is adjacent to the green second light emitter, and the blue first light emitter is adjacent to the blue second light emitter.

In some embodiments of the present invention, for the at least one pixel, the first light emitters are between the first subpixel controller and the second light emitters and the second light emitters are between the second subpixel controller and the first light emitters.

In some embodiments, for the at least one pixel, the first subpixel controller has an area that is greater than the combined areas of the first light emitters or the second subpixel controller has an area that is greater than the combined areas of the second light emitters, or both.

In some embodiments of the present invention, the first subpixel controller is adjacent to the second subpixel controller.

In some embodiments of the present invention, the second subpixel is disposed in a rotated arrangement with respect to the first subpixel. The rotation can be 45 degrees, 90 degrees, 135 degrees, 180 degrees, 225 degrees, 270 degrees, or 315 degrees, or any other rotation.

In some embodiments of the present invention, the redundant pixel layout comprises an array of pixel substrates disposed on or over the display substrate. Each pixel is disposed on or over a corresponding pixel substrate. Any one or all of the pixel substrates, the first subpixel controllers, or the first light emitters can each comprise a broken or separated tether. For the at least one pixel, any one or all of the second subpixel controllers and the second light emitters can each comprise a broken or separated tether.

In some embodiments of the present invention, the redundant pixel layout comprises an array of first pixel substrates disposed on or over the display substrate and an array of second pixel substrates disposed on or over the display substrate. Each first subpixel is disposed on or over a corresponding first pixel substrate and each second subpixel is disposed on or over a corresponding second pixel substrate. Any one or all of the first pixel substrates, the second pixel substrates, the first subpixel controllers, or the first light emitters can each comprise a broken or separated tether. For the at least one pixel, any one or all of the second subpixel controllers and the second light emitters can each comprise a broken or separated tether.

In some embodiments, no other light emitter or subpixel controller in the first subpixel is closer to the second-light-emitter location than the first light emitter.

In another aspect, the present invention is directed to a method of making a redundant pixel layout comprises providing a redundant pixel layout for a display. For each pixel in the array of pixels, the method further comprises providing a second subpixel controller electrically connected to the controller wires and a second light emitter electrically connected to the second-light-emitter wire, where the second light emitter is controlled by the second subpixel controller at least through the second-light-emitter wire, and testing the first subpixels in the array of pixels to identify bad first subpixels. The first subpixels can each comprise a power wire and a ground wire and the method further comprises cutting at least one power wire, one ground wire, one controller wire, or the first-light-emitter wire in at least one bad first subpixel. The second subpixels in the array of pixels can be tested to identify second bad subpixels. The second subpixels can each comprise a power wire and a ground wire and the method can further comprise cutting at least one power wire, one ground wire, one controller wire, or the second-light-emitter wire in at least one bad second subpixel.

According to embodiments of the present invention, a method of making a redundant pixel layout comprises providing a redundant pixel layout for a display and testing the first subpixels in the array of pixels to identify bad first subpixels. For each bad first subpixel, the method further comprises disposing a second subpixel controller electrically connected to the controller wires and a second light emitter electrically connected to the second-light-emitter wire, where the second light emitter is controlled by the second subpixel controller at least through the second-light-emitter wire. The first subpixels can each comprise a power wire and a ground wire and comprising cutting at least one power wire, one ground wire, one controller wire, or the first-light-emitter wire in at least one bad first subpixel.

The present invention provides displays including arrays of pixels on a display substrate that are addressed using active-matrix-addressing methods. The systems can include a redundant layout and redundant components in pixels to improve manufacturability and visual quality. The systems can also employ small integrated circuits at a high resolution that are transfer printed to the display substrate.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1A:
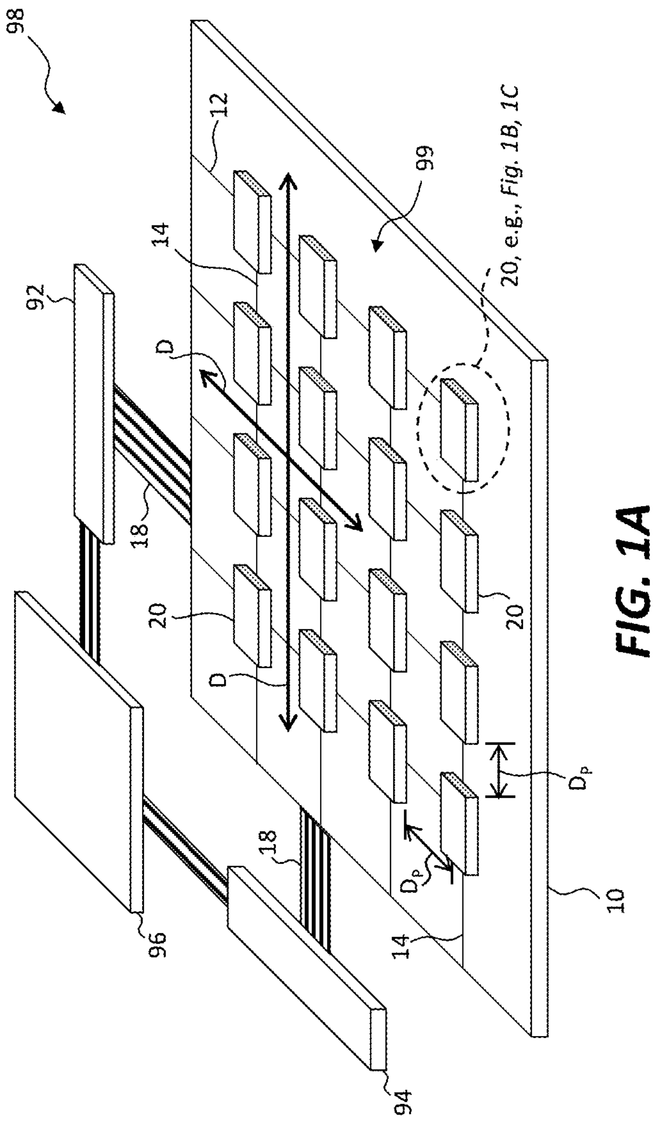
FIG. 1A is a schematic perspective of a display, according to illustrative embodiments of the present invention.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not drawn to scale since the variation in size of various elements in the Figures is too great to permit depiction to scale.

DETAILED DESCRIPTION OF CERTAIN EMBODIMENTS

The present invention provides, inter alia, structures and methods for an active-matrix display with small high-resolution elements that is tolerant of manufacturing and materials variability, particle contamination, and defects and that enables repair, thereby improving manufacturing yields and reducing costs. Moreover, certain embodiments of the present invention can provide improved visual color integration of multiple light emitters in a pixel that emit different colors of light. Certain embodiments of the present invention provide these advantages by providing redundant active-matrix controllers with redundant and adjacent light emitters in each pixel. In the event of a component failure in a pixel, redundant controllers or light emitters in the pixel can provide the operational capabilities of the failed component (e.g., wherein redundant controllers or light emitters continue to operate after failure of a component). In some embodiments, redundant controllers and redundant light emitters are disposed in redundant locations and electrically connected in every pixel. In certain embodiments, pixels can be tested and electrical connections to faulty controllers or faulty light emitters (or both) can be cut. In some embodiments, pixels with redundant controller locations and redundant light-emitter locations are tested to determine faulty pixels and redundant controllers and redundant light emitters disposed and electrically connected in locations of the faulty pixels to correct the fault.

Figure 1B:
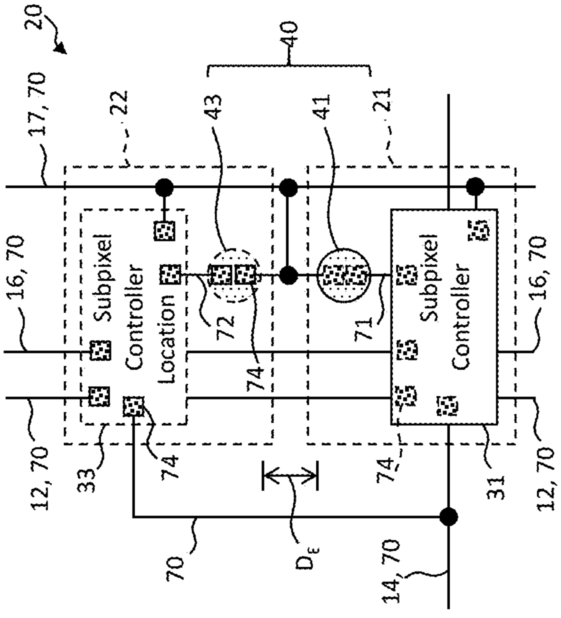
FIG. 1B is a detail schematic of FIG. 1A, according to illustrative embodiments of the present invention.

Referring to the perspective of FIG. 1A and detail of FIG. 1B, in some embodiments of the present invention, a redundant pixel layout 99 for a display 98 comprises a display substrate 10 and an array of pixels 20 disposed on or over display substrate 10, as shown in FIG. 1A. Referring to FIG. 1B, each pixel 20 comprises a first subpixel 21 comprising a first subpixel controller 31 electrically connected to controller wires 70 and a first light emitter 41 electrically connected to a first-light-emitter wire 71. First light emitter 41 is electrically controlled by first subpixel controller 31 at least through first-light-emitter wire 71. First subpixel 21 can comprise more than one first-light-emitter wire 71 electrically connected to first light emitter 41. Each pixel 20 further comprises a second subpixel 22 comprising a second-subpixel-controller location 33 comprising electrical connections to controller wires 70 and a second-light-emitter location 43 comprising electrical connections to a second-light-emitter wire 72. Second subpixel 22 can comprise more than one second-light-emitter wire 72 having an electrical connection to second-light-emitter location 43. Second subpixel 22 is redundant to first subpixel 21, first light emitter 41 is adjacent to second-light-emitter location 43, and first light emitter 41 and second-light-emitter location 43 are closer together than are any two pixels 20 in the array of pixels 20. Pixels 20 are separated by a pixel distance $D_P$ (e.g., as shown in FIG. 1A) and first light emitter 41 and second-light-emitter location 43 are separated by a light-emitter distance $D_E$ (e.g., as shown in FIGS. 1B, 1C) in any direction or dimension D parallel to a surface of the display substrate 10 on which the pixels 20 are disposed (FIG. 1A).

First subpixel controllers 31 and second subpixel controllers 32 are collectively referred to as subpixel controllers 30; first light emitters 41 and second light emitters 42 that emit light of any color are collectively referred to as light emitters 40.

Second-subpixel-controller locations 33 are elements comprising one or more control wires 70 (e.g., portion(s) thereof), one or more electrically conductive elements (e.g., contact pads 74), or both that are disposed on, in, or over display substrate 10 (e.g., an area or portion thereof) on, over, or in which second subpixel controllers 32 can be disposed such that when disposed, the second subpixel controllers 32 are electrically connected to controller wires 70 and contact pads 74 to operate as intended (e.g., to control one or more second light emitters 42). Similarly, second-light-emitter locations 43 are elements comprising one or more second-light-emitter wires 72 (e.g., areas or portion(s) thereof), one or more electrically conductive elements (e.g., contact pads 74), or both disposed on, in, or over display substrate 10 (e.g., an area or portion thereof) on, over, or in which second light emitters 42 can be disposed such that when disposed, the second light emitters are electrically connected to second-light-emitter wire 72 and contact pads 74 to operate as intended (e.g., to emit light in response to control signals from a second subpixel controller 32). FIG. 1B illustrates a redundant pixel layout 99 with second-subpixel-controller location 33 and second-light-emitter location 43 shown with dashed lines. Contact pads 74 in first and second subpixels 21, 22 are indicated as rectangles on display substrate 10 to indicate electrically conductive areas to which a second subpixel controller 32 or second light emitter 42 (or first subpixel controller 31 or first light emitter 41) could be electrically connected. Contact pads 74 are typically, but not necessarily, formed from electrically conductive metals such as aluminum, polysilicon, or transparent conductive oxides using masking and deposition processes known in the art.

Figure 1C:
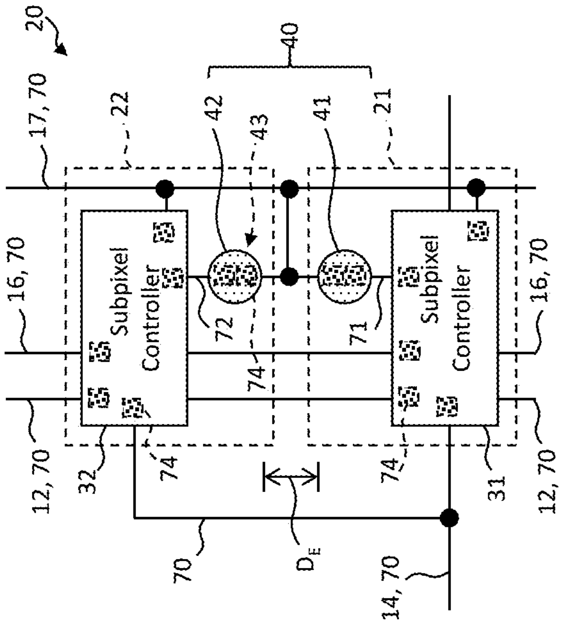
FIG. 1C is a detail schematic of FIG. 1A with a second subpixel controller and a second light emitter, according to illustrative embodiments of the present invention.

FIG. 1C illustrates a redundant pixel layout 99 with a second subpixel controller 32 disposed in second-subpixel-controller location 33 and a second light emitter 42 disposed in second-light-emitter location 43. Thus, in some embodiments of the present invention, for at least one pixel 20 in an array of pixels 20, second subpixel 22 of the at least one pixel 20 comprises a second subpixel controller 32 electrically connected to controller wires 70. Second subpixel 22 of the at least one pixel 20 further comprises a second light emitter 42 electrically connected to second-light-emitter wire 72. Second light emitter 42 is controlled by second subpixel controller 32 at least through second-light-emitter wire 72. In FIG. 1C, contact pads 74 are illustrated with dashed lines to indicate that they are obscured by the presence of first and second subpixel controllers 31, 32 and first and second light emitters 41, 42.

Controller wires 70 can be electrically connected in common to both first and second subpixel controllers 31, 32 since the second subpixel 22 is redundant to the first subpixel 21. Controller wires 70, as used herein, can refer to, but are not limited to, wires that are used to provide control signals and power or ground (e.g., row lines 14, column lines 12, power wire 16, and ground wire 17) to first and second subpixels 21, 22. (The word "line" also refers to a "wire" and vice versa. Both are electrical conductors that convey electrical signals, voltages, or currents.) First subpixel controller 31 controls first light emitter 41 at least through first-light-emitter wire 71. Ground wire 17 can be electrically connected to first light emitter 41, second light emitter 42, first subpixel controller 31, and second subpixel controller 32 and can be considered any combination or all of a controller wire 70, a first-light-emitter wire 71, and a second-light-emitter wire 72. First-light-emitter wire 71 is electrically connected to both first light emitter 41 and first subpixel controller 31 to enable first subpixel controller 31 to control first light emitter 41. Similarly, second-light-emitter wire 72 is electrically connected to both second-light-emitter location 43 and second-subpixel-controller location 33 to enable control of second light emitter 42, as shown in FIG. 1B. As illustrated in FIG. 1C, second-light-emitter wire 72 is electrically connected to both second light emitter 42 and second subpixel controller 32 to enable second subpixel controller 32 to control second light emitter 42.

As used herein, a second subpixel 22 is redundant to first subpixel 21 if the second subpixel 22 is intended to replicate and have substantially identical functions and components (e.g., within manufacturing tolerances) as the first subpixel 21. For example, in certain embodiments, a second subpixel 22 comprising a second-subpixel location is redundant to a first subpixel 21 if, when a second subpixel controller 32 is disposed in a second-pixel-controller location 33 and electrically connected to controller wires 70 and a second light emitter 42 is disposed in a second-light-emitter location 43 and electrically connected to second-light-emitter wire 72, then the second subpixel 22 replicates and has substantially identical function to the first subpixel 21. Thus, first subpixel 21 can be electrically connected in parallel with second subpixel 22. In some such embodiments, second subpixel controller 32 is intended to be functionally identical to first subpixel controller 31 and second light emitter 42 is intended to be functionally identical to first light emitter 41 and second subpixel 22 is intended to be substantially identically electrically connected to the same inputs and outputs (if any) as first subpixel 21. Thus, in certain embodiments, if both first and second subpixels 21, 22 are operating properly, they will respond to the same input signals in the same way and at the same time to perform the same function.

If first subpixel 21 is defective, missing, or improperly connected to its electrical connections, a properly functional and electrically connected second subpixel 22 can operate in the place of first subpixel 21, or vice versa. In some embodiments of the present invention, first subpixel 21 is faulty. In some embodiments of the present invention, second subpixel 22 is faulty. In some embodiments of the present invention, a controller wire 70, first-light-emitter wire 71, second-light-emitter wire 72, a power wire 16, or a ground wire 17 in a pixel 20 is cut (e.g., to prevent operation of a faulty subpixel). In some embodiments, the cut wire is in a faulty first subpixel 21 or a faulty second subpixel 22, or both.

Referring to FIG. 1B and discussed above, second subpixel 22 is redundant to first subpixel 21 because second subpixel 22 comprises a second subpixel location 32 comprising an element comprising electrical connections disposed in a portion or area of display substrate 10 that provide the same signals and electrical connections as those of first subpixel 21. Referring to FIG. 1C, second subpixel 22 is redundant to first subpixel 21 because first subpixel controller 31 is substantially functionally identical to second subpixel controller 32, first light emitter 41 is substantially functionally identical to second light emitter 42, both first and second subpixel controllers 31, 32 are electrically connected to power wire 16, ground wire 17, the same row line 14, and the same column line 12, and first and second light emitters 41, 42 are electrically connected to ground wire 17 and a similar control signal from their respective subpixel controllers 30. Thus, first and second subpixels 21, 22 are substantially identically electrically connected and are intended to operate identically.

According to some embodiments of the present invention, substantially identical components, functionality, operation, and electrical connections need not be exactly identical. Those familiar with manufacturing process control will understand that variations in materials and processes will result in corresponding differences in structures and functions in manufactured devices. As intended herein, "substantially identical" components, functions, or connections are intended to operate identically but can differ in their operation within manufacturing variability and tolerances. For example, first light emitter 41 can differ from substantially identical second light emitter 42 in efficiency, color of light emission, lifetime, and other operating characteristics or parameters if first and second light emitters 41, 42 are designed and intended to be the same.

As used herein, elements (e.g., light emitters 40, subpixel controllers 30, light-emitter locations 43, or subpixel-controller locations 33) disposed on or over display substrate 10 within a common pixel 20 that are "adjacent" have no spatially intervening element (e.g., no spatially intervening functionally similar element) on or over display substrate 10 in a direction D substantially parallel to a surface of display substrate 10 on which the elements are disposed. Hence, no other element within a common pixel 20 is between adjacent elements on or over the surface of display substrate 10. Thus, a first light emitter 41 in a first subpixel 21 is adjacent to a second light emitter 42 (or second-light-emitter location 43) in a second subpixel 22 in a common pixel 20 when there is no other first or second light emitter 41, 42 (or first-light-emitter location or second light-emitter location 43) in the first or second subpixel 21, 22 between them. Furthermore, in some embodiments, no subpixel controller 30 is closer to the adjacent first and second light emitters 41, 42. As used herein, elements are only "adjacent" when part of a common pixel 20 (i.e., the term is only applicable within a pixel 20). Thus, for example, light emitters 40 in a common pixel 20 can be adjacent or subpixel controllers 30 in a common pixel 20 can be adjacent, but light emitters 40 in different pixels 20 cannot be adjacent and subpixel controllers 30 in different pixels 20 cannot be adjacent. Components in different pixels 20 are not considered adjacent. As used herein, adjacent components can only include subpixel controllers 30, light emitters 40, and light emitter locations 43. Furthermore, controller wires 70, first light-emitter wires 71, and second light-emitter wires 72 are not considered adjacent and are not considered to intervene between adjacent light emitters 40, light emitter locations 43, subpixel controllers 30, or subpixel-controller locations 33, even if present. In some embodiments, a first element (e.g., light emitter 40, light-emitter location 43, subpixel controller 30, or subpixel-controller location 33) is adjacent to a second element (e.g., light emitter, 40, light-emitter location 43, subpixel controller 30, or subpixel-controller location 33) when there is no other element (e.g., light emitter 40, light-emitter location 43, subpixel controller 30, or subpixel-controller location 33) disposed therebetween and also the elements are equally close or closer together than any other element (e.g., light emitter 40, light-emitter location 43, subpixel controller 30, or subpixel-controller location 33) is to the first element. In some embodiments, for example, a first light emitter 41 in a first subpixel 21 is adjacent to a second light emitter 42 in a second subpixel 22 when no element (e.g., light emitter 40 or subpixel controller 30 of any subpixel (e.g., first or second subpixels 21, 22)) is disposed therebetween and the second light emitter 42 is the closest element (e.g., of the second subpixel 22) to the first light emitter 41 (or, in some embodiments, is equally close to the first light emitter 42 as another light emitter 40 (e.g., in the first subpixel 21 or second subpixel 22)).

For example, according to some embodiments of the present invention and as shown in FIG. 1C, no other light emitter 40 is disposed between adjacent light emitters 40 (or corresponding locations) on or over the surface of display substrate 10 and in a direction D substantially parallel to a surface of display substrate 10 on which light emitters 40 are disposed (as shown in FIG. 1A). Furthermore, in this example, no subpixel controller 30 is disposed between two adjacent light emitters 40. Similarly, adjacent subpixel controllers 30 have no spatially intervening other subpixel controller 30 or light emitter 40 disposed between the adjacent subpixel controllers 30 on or over display substrate 10. FIG. 1C illustrates two adjacent light emitters 40 and two subpixel controllers 30 that are not adjacent.

According to some embodiments of the present invention, first and second light emitters 41, 42 are disposed closer together on or over display substrate 10 and in a direction D substantially parallel to a surface of display substrate 10 on or over which the first and second light emitters 41, 42 are disposed than are any two pixels 20 in an array of pixels 20. According to some embodiments, first and second light emitters 41, 42 are disposed closer together on or over display substrate 10 and in a direction D substantially parallel to a surface of display substrate 10 on or over which the first and second light emitters 41, 42 are disposed than any two subpixel controllers 30 in different pixels 20 in the array of pixels 20. Since an objective of certain embodiments of the present invention is to provide robust pixels 20 that can operate in the presence of failed subpixel controllers 30 or light emitters 40, or both, and provide improved color integration of the light from pixels 20, it is desirable that the redundant components operate electrically, optically, visually, and spatially identically. By disposing first and second light emitters 41, 42 relatively close together, first and second light emitters 41, 42 are less visually distinguishable and therefore more readily appear as a single light emitter 40 at a single light-emitter location. As is well known in the art, the human visual system is sensitive to visible spatial discontinuities or disruptions in regular structures, such as an array of pixels 20 in a display 98. Thus, redundant second light emitters 42 that are not located in the same location as first light emitters 41 or in close proximity could be visible as an anomaly to a viewer. By disposing redundant second light emitters 42 in a subpixel location adjacent to and very close to the location of a first light emitter 41, any such visible anomalies or abnormalities are reduced or eliminated.

Referring to FIG. 1A, active-matrix pixels 20 in display 98 can be controlled through row and column lines 14, 12 that convey control and data signals from row and column controllers 94, 92 under the direction of display or system controller 96. Row, column, and system controllers 94, 92, 96 can be located on display substrate 10 or external to display 98 (as shown in FIG. 1A) and electrically connected through buses 18 that provide electrical connections to the display substrate 10. Row, column, and system controllers 94, 92, 96 can be integrated circuits that comprise a display controller. Buses 18 can be provided in ribbon cables and connectors, and row and column lines 14, 12 can be formed on or in display substrate 10 using photolithographic methods and materials, for example to make metal wires or traces, as is known in the display industry.

In operation, system controller 96 of display 98 provides control signals to row controllers 94 and data signals to column controllers 92 through bus 18. Row and column controllers 94, 92 distribute the signals over row and column lines 14, 12 to pixels 20 to provide active-matrix control to the display 98. In a fully functional display 98, as illustrated in FIG. 1B, the control and data signals are provided to second-subpixel-controller location 33 and second-light-emitter location 43. The control and data signals are also received by first subpixel controller 31 and first subpixel controller 31 controls first light emitter 41 to emit light as desired. In a fully functional display 98, as illustrated in FIG. 1C, the control and data signals are received by both first and second subpixel controllers 31, 32. First subpixel controller 31 controls first light emitter 41 to emit light as desired and second subpixel controller 32 controls second light emitter 42 to emit light as desired. Since, in some embodiments with no faults, both first and second subpixels 21, 22 emit light, the display 98 can be calibrated, for example by system controller 96 to emit the desired amount of light, for example by specifying that first and second subpixels 21, 22 of a pixel 20 each emit one half of the nominal amount of light so that when the two light emitters 40 (first and second light emitters 41, 42) emit light, the desired, nominal amount of light is emitted from the pixel 20.

If a first subpixel 21 in a pixel 20 is faulty, the second subpixel 22 can emit the desired amount of light from the pixel 20, or vice versa. In such embodiments, in operation the control and data signals are received by both first and second subpixel controllers 31, 32. Because first subpixel controller 31 or first light emitter 41 is faulty (or, e.g., the controller wire 70 or first-light-emitter wire 71 is faulty), light is not emitted as desired. However, second subpixel controller 32 can control second light emitter 42 to emit light as desired from pixel 20. Similarly, if second subpixel 22 is faulty, first subpixel 21 can provide the light desired from pixel 20. In some embodiments, pixels 20 are tested to determine any faulty first or second subpixels 21, 22 and the results of testing can be used to properly produce signals (e.g., from system controller 96 and/or first or second subpixel controllers 31, 32) to drive first and second subpixels 21, 22.

Display substrate 10 can be any suitable substrate having a surface on or over which pixels 20, first and second subpixels 21, 22, subpixel controllers 30, and light emitters 40 can be disposed, for example and without limitation, a substrate comprising glass, plastic, ceramic, quartz, sapphire, or a semiconductor as are used in the integrated circuit or display industry. Subpixel controllers 30, system controller 96, row controller 94, and column controller 92 can be integrated circuits or discrete components and can be analog, digital, or mixed-signal circuits and can be silicon circuits made using integrated circuit methods and materials. Light emitters 40 can be light-emitting diodes such as inorganic light-emitting diodes (ILEDs). Light emitters 40 can be formed in any one or more of a variety of doped or undoped compound semiconductors, such as, for example and without limitation, one or more of GaN, InGaN, GaAs, AlGaAs, GaAsP, GaP, AlGaInP, SiC, CdSe, CdS, and ZnSe.

In some embodiments, subpixel controllers 30, light emitters 40, or both, are provided in separate components with independent and separate substrates and are disposed on display substrate 10, for example using surface mount technology and assembly or using transfer printing. In some embodiments, subpixel controllers 30 or light emitters 40 comprise or are bare unpackaged die, integrated circuits, or unpackaged integrated circuits. In some embodiments, subpixel controllers 30 or light emitters 40 can be or include one or more of electronic circuits, optical circuits, transducers, light-emitting diodes, micro-light-emitting diodes, sensors, capacitive sensors, touch sensors, photo-sensors, electromagnetic radiation sensors, and piezo-electric sensors.

Transfer printing materials and methods can dispose very small devices on a substrate such as display substrate 10, for example having at least one of a length and a width less than or equal to 200, 100, 50, 20, or 10 microns. According to some embodiments of the present invention, such small devices can improve display resolution and the visual quality of display 98 by enabling the disposition of second light emitters 42 very close to first light emitters 41, so that viewers cannot readily visually distinguish second light emitters 42 from first light emitters 41 and substantially preventing spatial visual anomalies from displays 98 using redundant second light emitters 42 to improve display 98 yields and visual quality.

FIGS. 1A, 1B, and 1C illustrate pixels 20 with a single light emitter 40 in each of first and second subpixels 21, 22. In some embodiments of the present invention, first subpixel 21 comprises two or more first light emitters 41, for example three first light emitters 41 (e.g., red first light emitter 41R, green first light emitter 41G, blue first light emitter 41B) and second subpixel 22 comprises two or more second-light-emitter locations (e.g., red second-light-emitter location 43R, green second-light-emitter location 43G, blue second-light-emitter location 43B) (e.g., as illustrated in FIG. 2A).

Figure 2B:
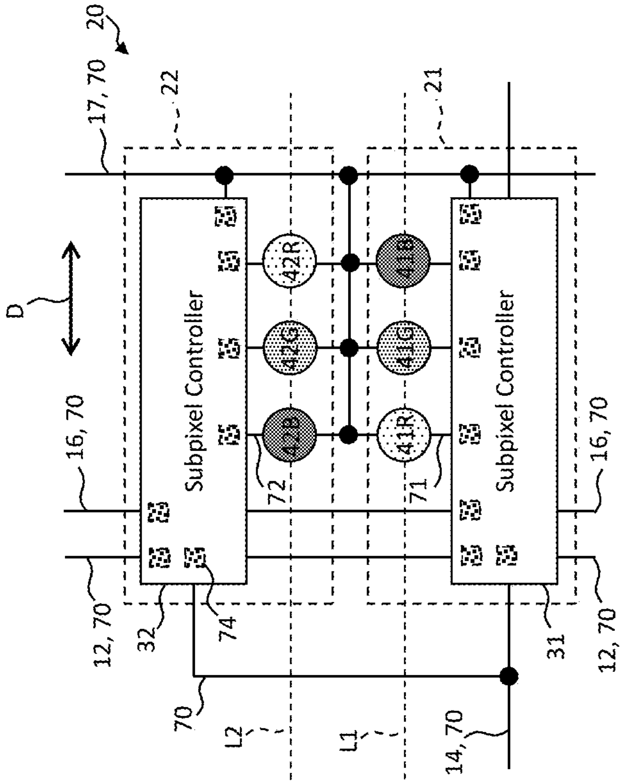
FIG. 2B is a schematic illustration of a pixel comprising three light emitters in each subpixel, according to illustrative embodiments of the present invention.

Referring to FIG. 2B, second subpixel 22 comprises two or more light emitters 40 (e.g., red second light emitter 42R, green second light emitter 42G, blue second light emitter 42B). In some such embodiments, first subpixel 21 of pixel 20 comprises two or more first light emitters 41 that each emit light of a different color from other first light emitters 41 and second subpixel 22 of pixel 20 comprises two or more second light emitters 42 that each emit light of a different color from other second light emitters 42. In some embodiments of the present invention, two or more first light emitters 41 comprise a red first light emitter 41R that emits red light, a green first light emitter 41G that emits green light, and a blue first light emitter 41B that emits blue light. Similarly, two or more second light emitters 42 can comprise a red second light emitter 42R that emits red light, a green second light emitter 42G that emits green light, and a blue second light emitter 42B that emits blue light. First light emitters 41 are disposed in a first line L1 and second light emitters 42 are disposed in a second line L2 different from but parallel to first line L1. In some such embodiments, first light emitters 41 are between second light emitters 42 and first subpixel controller 31 and second light emitters 42 are between second subpixel controller 32 and first light emitters 41, providing a relatively square and compact pixel 20 area over display substrate 10 that can have a higher resolution and improved appearance.

Figure 2A:
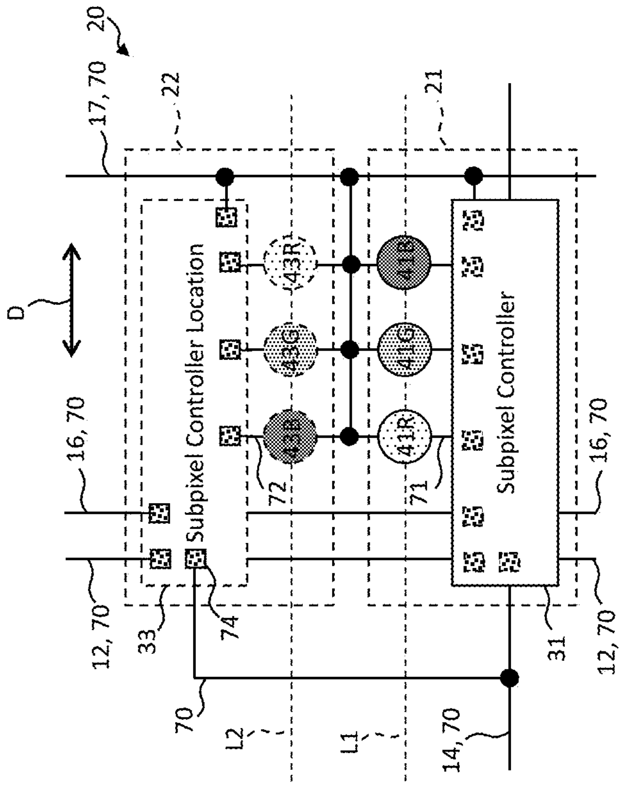
FIG. 2A is a schematic illustration of a pixel comprising three light emitters in a first subpixel and three light-emitter locations in a second subpixel, according to illustrative embodiments of the present invention.

According to some embodiments of the present invention, for example as shown in FIG. 2A, a first group of light emitters (e.g., comprising red, green, and blue first light emitters 41R, 41G, 41B) is adjacent to a second group of second-light-emitter locations 43 (e.g., comprising red, green, and blue second-light-emitter locations 43R, 43G, 43B) when no light emitters 40, light emitter locations 43, or subpixel controllers 32 not in the first group or the second group are disposed therebetween. According to some embodiments of the present invention, for example as shown in FIG. 2B, a first group of light emitters 40 (e.g., comprising red, green, and blue first light emitters 41R, 41G, 41B) is adjacent to a second group of light emitters 40 (e.g., comprising red, green, and blue second light emitters 42R, 42G, 42B) when no light emitters 40, light emitter locations 43, or subpixel controllers 32 not in the first group or the second group or are disposed therebetween. A group of light emitters 40 or light-emitter locations 43 is a set of light emitters 40 or light-emitter locations 43 or a combination thereof, respectively, that are electrically connected to a common subpixel controller or subpixel-controller location, respectively. Referring to FIG. 2A, first subpixel controller 31 is not adjacent second-subpixel-controller location 33. Referring to FIG. 2B, first and second subpixel controllers 31, 32 are not adjacent. Furthermore, as illustrated in FIG. 2B, red first light emitter 41R is adjacent to blue second light emitter 42B, green first light emitter 41G is adjacent to green second light emitter 42G, and blue first light emitter 41B is adjacent to red second light emitter 42R. Thus, first light emitters 41 of pixel 20 are adjacent to second light emitters 42 of pixel 20. This arrangement has the advantage of a more compact light emitting area for first and second light emitters 41, 42 over display substrate 10, improving color light integration of the entire pixel 20.

In some embodiments, either first or second light emitters 41, 42 are reordered so that red first light emitter 41R is adjacent to red second light emitter 42R, green first light emitter 41G is adjacent to green second light emitter 42G, and blue first light emitter 41B is adjacent to blue second light emitter 42B, thus providing a compact layout and disposing first and second light emitters 41, 42 of each color closer.

Figure 3A:
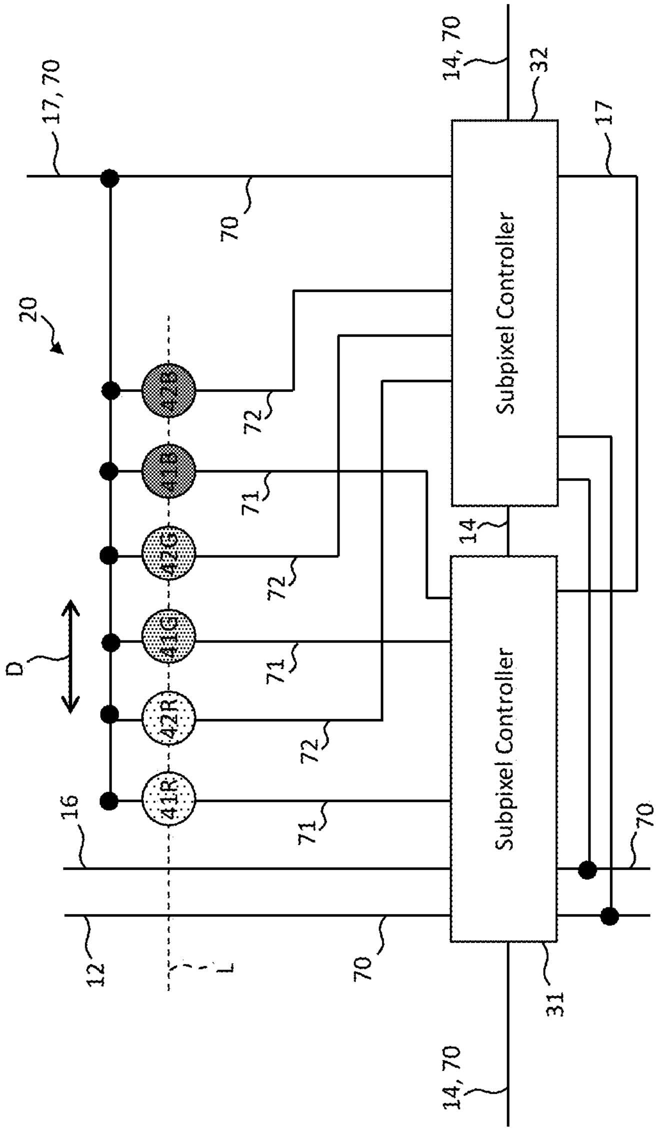
FIG. 3A is a schematic illustration of a pixel comprising a single row of light emitters, according to illustrative embodiments of the present invention.
Figure 3B:
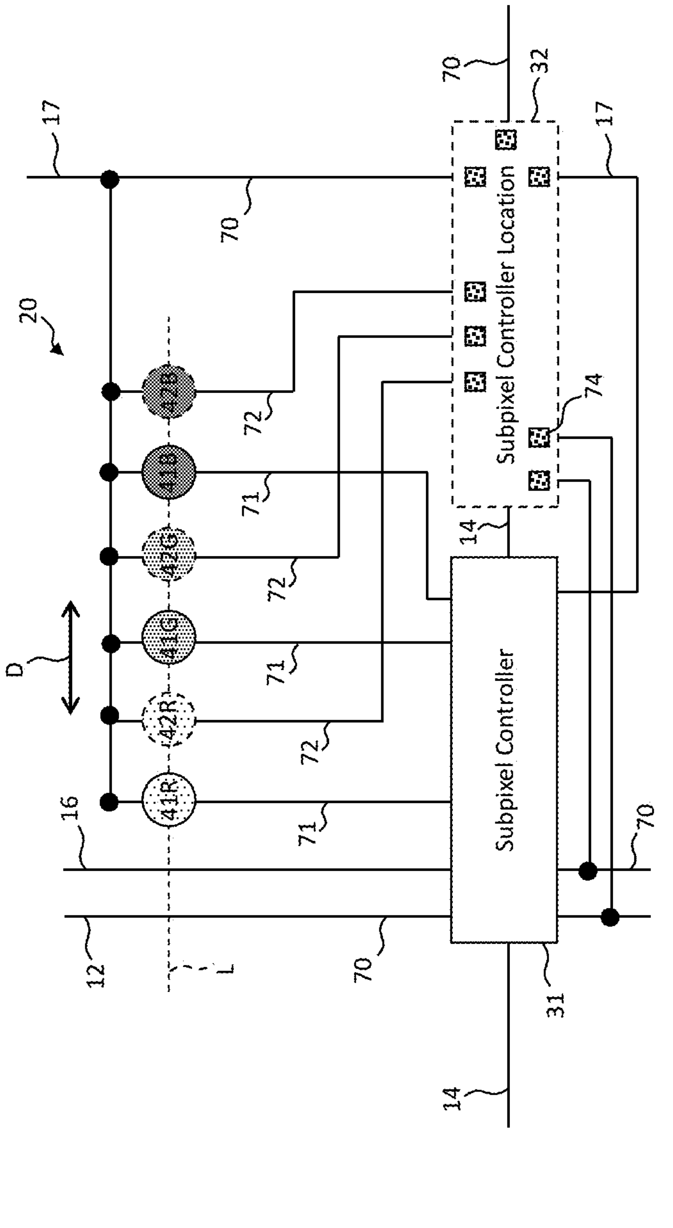
FIG. 3B is a schematic illustration of a pixel comprising a single row of light emitters and light-emitter locations, according to illustrative embodiments of the present invention.

Referring to FIG. 3A, in some embodiments of the present invention, first light emitters 41 of pixel 20 and second light emitters 42 of pixel 20 are disposed in a common line L, red first and second light emitters 41R, 42R are adjacent, green first and second light emitters 41G, 42G are adjacent, and blue first and second light emitters 41B, 42B are adjacent, so that first light emitters 41 are interdigitated with second light emitters 42 in a pixel 20. In the illustrative embodiment shown in FIG. 3A, first and second subpixel controllers 31, 32 are also adjacent. This arrangement has the advantage of locating redundant red second light emitter 42R closer to red first light emitter 41R, locating redundant green second light emitter 42G closer to green first light emitter 41G, and locating redundant blue second light emitter 42B closer to the blue first light emitter 41B. FIG. 3B shows a structure corresponding to FIG. 3A before second subpixel controller 32 and second light emitters 42R, 42G, 42B have been disposed (e.g., second subpixel 22 comprises second-subpixel-controller location 33 and second-light-emitter locations 43R, 43G, 43B).

Certain embodiments of the present invention provide advantages in manufacturing repair and yields, as well as in color integration from light emitters 40 in a pixel 20, for example enabled by micro-transfer printing very small light emitters 40 such as inorganic micro-LEDs. In some embodiments, for example as shown in FIG. 1C, first subpixel controller 31 has an area that is greater than an area of first light emitter 41 or second subpixel controller 32 has an area that is greater than an area of second light emitter 42, or both. According to some embodiments of the present invention, such as those shown in FIGS. 2 and 3, first subpixel controller 31 has an area that is greater than the combined areas of all of the first light emitters 41, second subpixel controller 32 has an area that is greater than the combined areas of all of the second light emitters 42, or both.

Figure 4B:
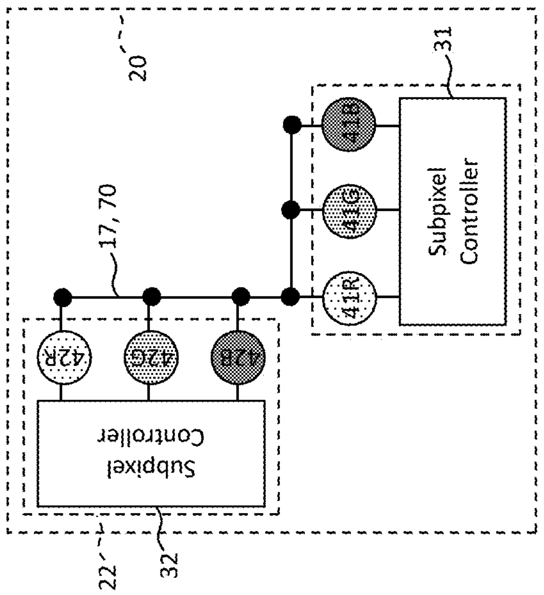
FIGS. 4A and 4B are schematic illustrations of rotated subpixels, according to illustrative embodiments of the present invention.
Figure 4A:
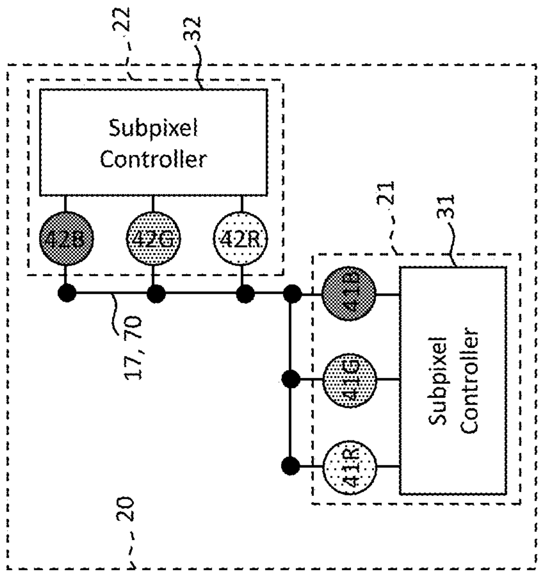
Figure 4D:
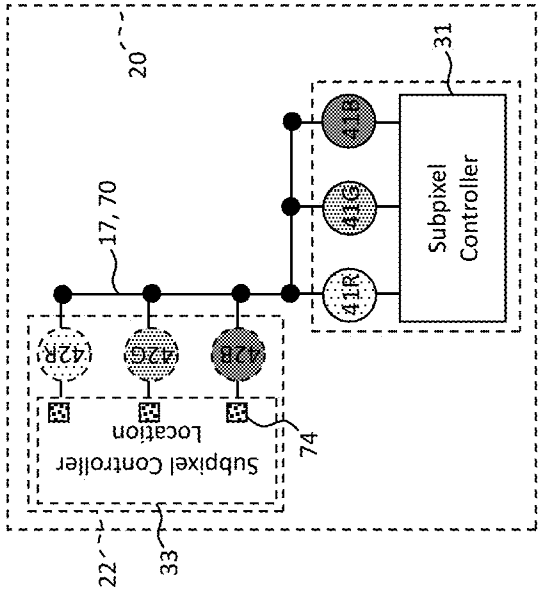
FIGS. 4C and 4D are schematic illustrations of rotated subpixel locations, according to illustrative embodiments of the present invention.
Figure 4C:
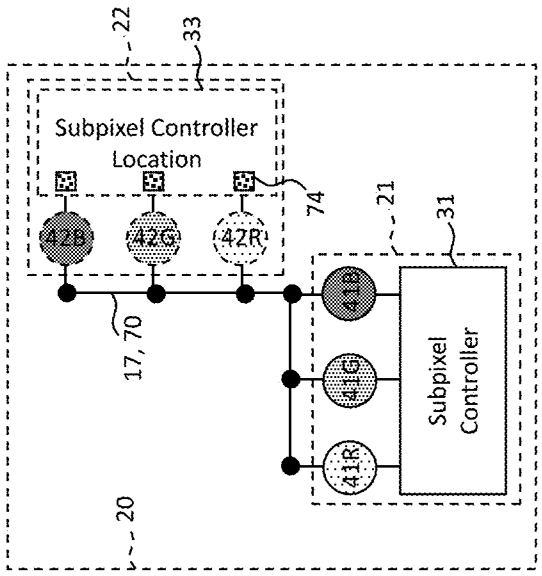

FIGS. 2A and 2B illustrate embodiments of the present invention in which second subpixel 22 is a redundant replica of first subpixel 21 rotated by 180 degrees about an axis perpendicular to a surface of display substrate 10 on which first and second subpixels 21, 22 are disposed. In some embodiments, second subpixel 22 can be a redundant replica of first subpixel 21 rotated by other amounts, for example by 90 degrees (shown in FIG. 4A) or by 270 degrees (shown in FIG. 4B). Other rotational amounts are also possible, for example 45 degrees, 135 degrees, 225 degrees, or 315 degrees, or any other rotation. FIGS. 4C and 4D show corresponding structures to FIGS. 4A and 4B before second subpixel controller 32 and second light emitters 42R, 42B, 42G have been disposed (e.g., second subpixel 22 comprises second-subpixel-controller location 33 and second-light-emitter locations 43R, 43B, 43G).

Figure 5:
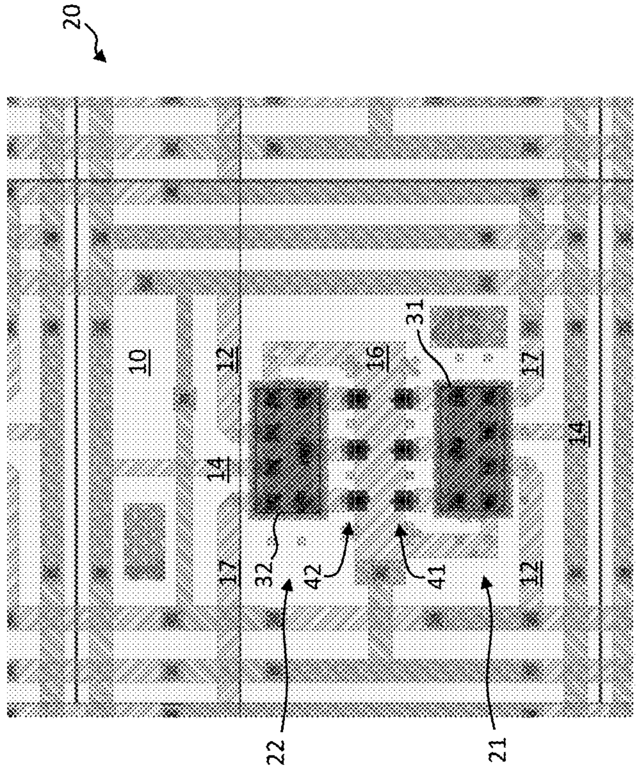
FIG. 5 is a plan view layout of a pixel corresponding to the schematic illustration of FIG. 2B, according to illustrative embodiments of the present invention.
Figure 6:
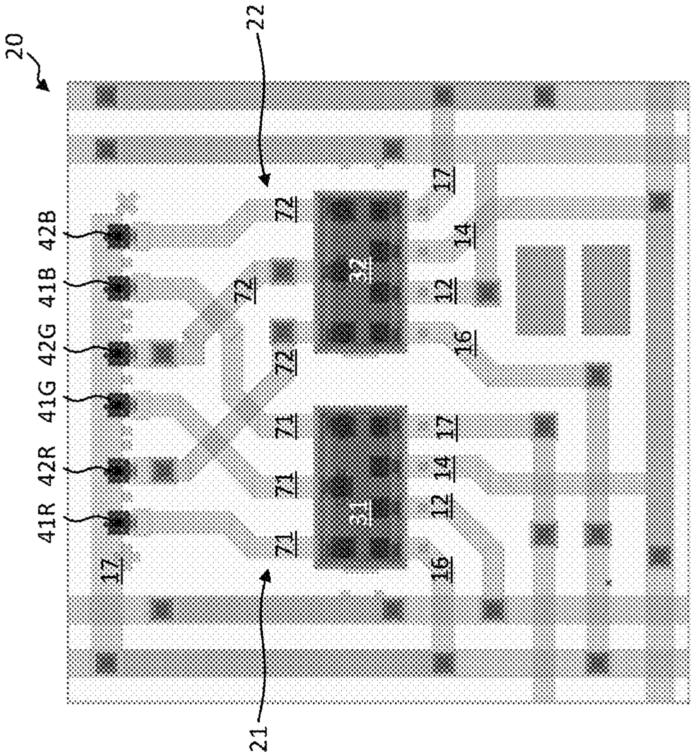
FIG. 6 is a plan view layout of a pixel corresponding to the schematic illustration of FIG. 3, according to illustrative embodiments of the present invention.

FIG. 5 is an exemplary layout of the configuration illustrated in FIGS. 2A and 2B on a display substrate 10 and FIG. 6 is a layout of the configuration illustrated in FIG. 3 on a display substrate 10, with power wire 16 (Vdd) as the common connection to the light emitters 40, rather than the ground wire 17. Those knowledgeable in the electronic arts will understand that negative logic can be used rather than positive logic to implement electronic circuits. Embodiments according to FIGS. 2A and 2B using the FIG. 5 layout have been constructed, tested, and successfully operated.

Figure 7:
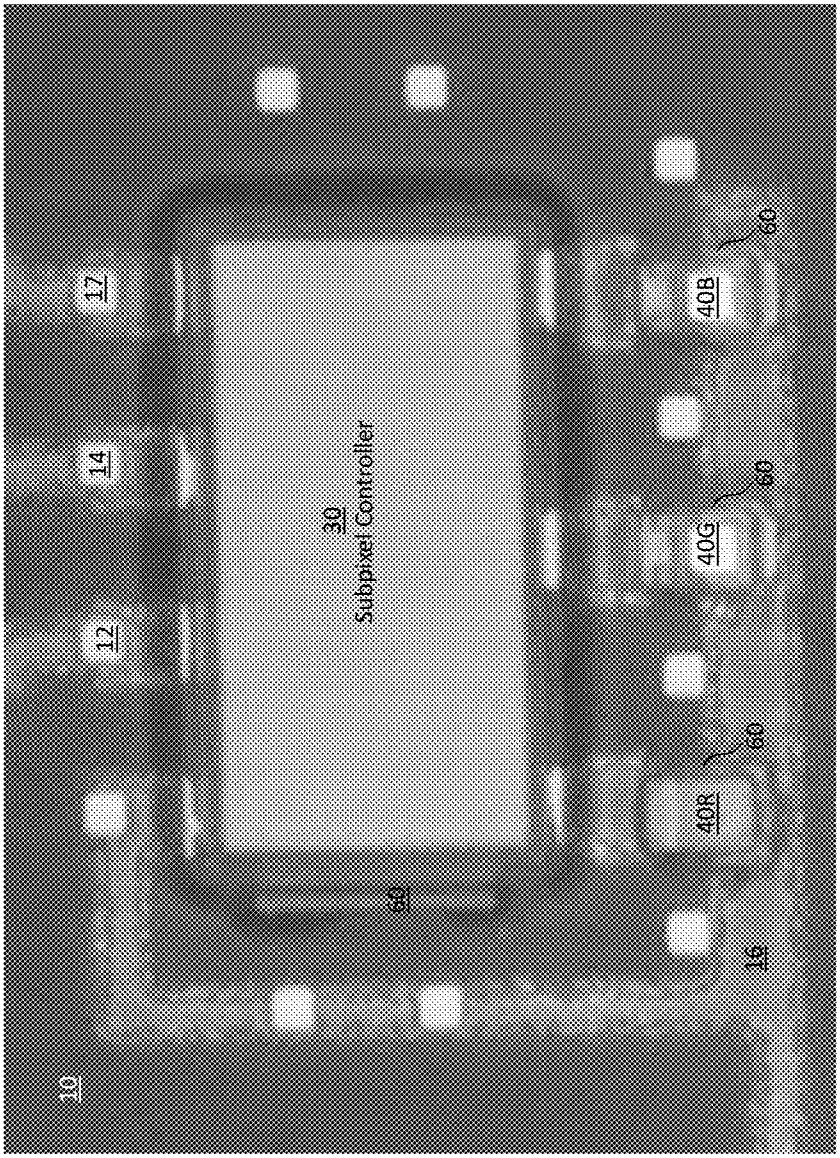
FIG. 7 is a micrograph of a constructed sub-pixel, according to illustrative embodiments of the present invention.

Certain exemplary embodiments of the present invention have been constructed using micro-transfer printing. In an exemplary micro-transfer printing process, components such as light emitters 40 or subpixel controllers 30 are constructed on substrates of native source wafers, for example crystalline semiconductors. The native substrates can be of different types, for example compound semiconductors for light emitters 40 (e.g., when light emitters 40 are inorganic light emitting diodes) and silicon for subpixel controllers 30. The components are disposed over sacrificial portions separated by anchor portions of a sacrificial layer on the native wafers. The sacrificial portions are etched, for example with a liquid chemical etchant, to release the components from the native wafer leaving the components attached to the anchor portions by one or more tethers 60. A stamp, for example a PDMS stamp having a post for each component, is pressed against the components so that a component is adhered to each post, the stamp is removed so that the tethers 60 fracture or separate, leaving the components adhered to the stamp posts. The components on the posts are then pressed against a destination substrate to adhere the components to the destination substrate, and the stamp is removed, leaving components with fractured or separated tethers 60 on the destination substrate, where they can be further processed, for example photolithographically processed to electrically interconnect the components, or can be tested. FIG. 7 shows fractured tethers 60 of subpixel controller 30 and light emitters 40R, 40G, 40B after the elements have been disposed on display substrate 10 by micro-transfer printing.

Figure 8:
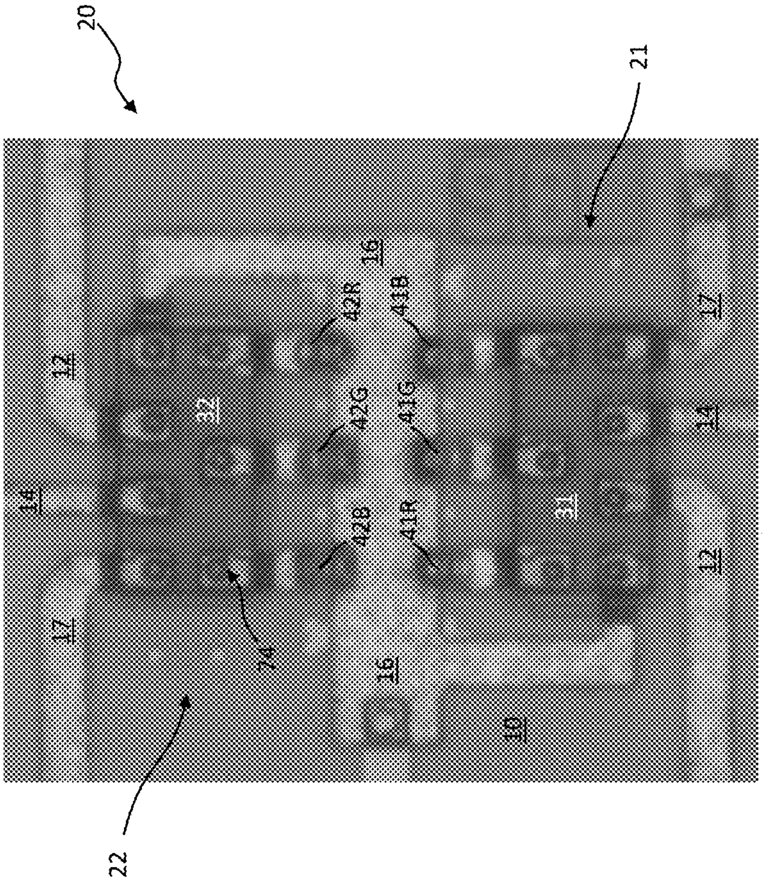
FIG. 8 is a micrograph of a constructed pixel, according to illustrative embodiments of the present invention.
Figure 9:
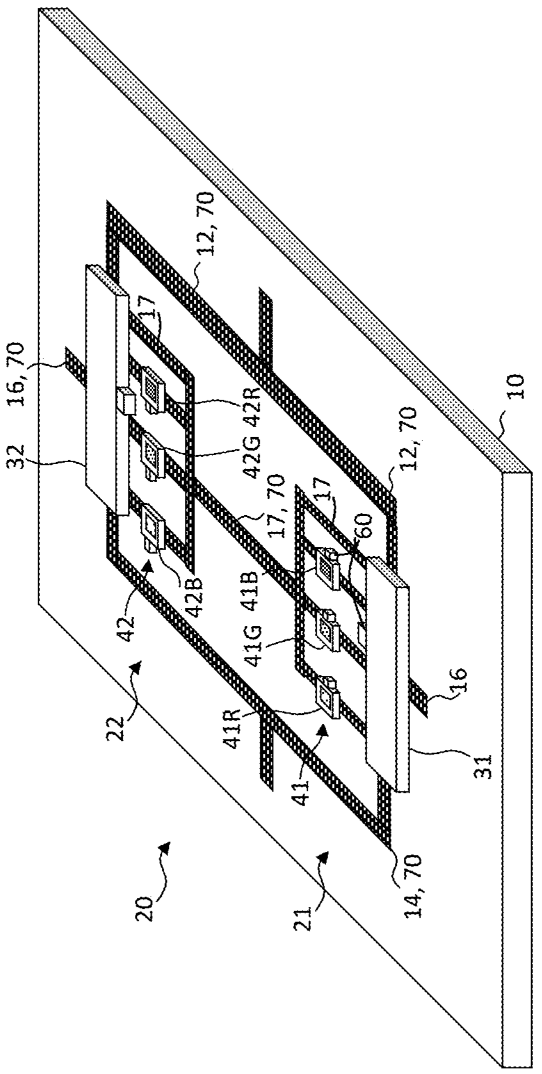
FIG. 9 is a schematic perspective of a pixel disposed on a display substrate, according to illustrative embodiments of the present invention.

FIG. 7 is a micrograph of a subpixel (e.g., first subpixel 21 or second subpixel 22), FIG. 8 is a micrograph of a complete pixel 20, and FIG. 9 is a perspective of a pixel 20 from above display substrate 10 corresponding to FIGS. 2A, 2B, and 5. In these illustrative embodiments, light emitters 40 (e.g., red light emitter 40R, green light emitter 40G, blue light emitter 40B) and subpixel controllers 30 are disposed directly on display substrate 10 or layers disposed on display substrate 10 by micro-transfer printing light emitters 40 and subpixel controllers 30 from respective native source substrate wafers directly to display substrate 10 or layers disposed on display substrate 10. The structures illustrated in FIGS. 7 and 8 have been constructed and successfully operated according to certain embodiments of the present invention, using a power wire 16 (Vdd) as a common connection to the light emitters 40, and as illustrated in FIGS. 5 and 6, rather than a ground wire 17 as in FIGS. 1-4. In certain embodiments, for example as shown in FIG. 8, one or more of light emitters 40 and subpixel controllers 30 can comprise one or more photolithographically defined electrodes for making appropriate electrical connection from the one or more of light emitters 40 or subpixel controllers 30 to electrical connections disposed on display substrate 10.

Figure 10:
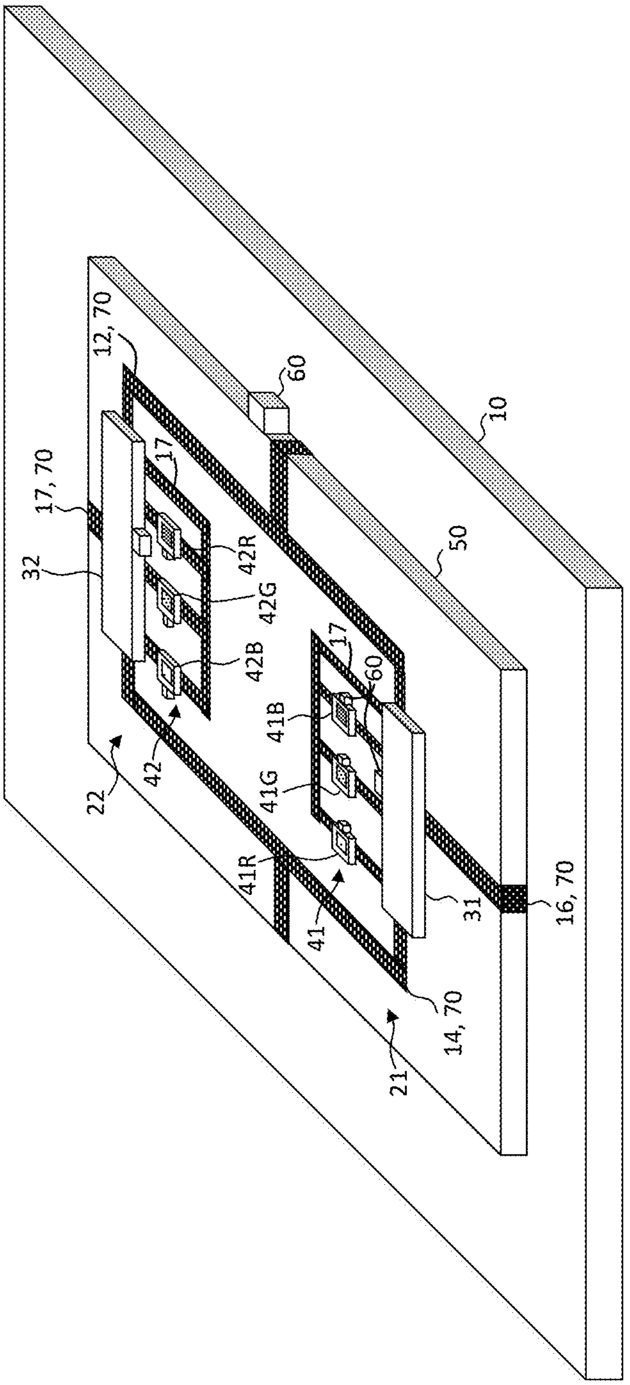
FIG. 10 is a schematic perspective of a pixel disposed on a pixel substrate, according to illustrative embodiments of the present invention.

In some embodiments of the present invention, referring to FIG. 10, redundant pixel layout 99 comprises an array of pixel substrates 50 disposed on or over display substrate 10. Each pixel 20 is disposed on or over a corresponding pixel substrate 50 and any one or all of first subpixel controllers 31, first light emitters 41, second subpixel controllers 32, and second light emitters 42 can be micro-transfer printed from a source native wafer to pixel substrate 50, can be adhered to pixel substrate 50, for example with an adhesive such as a curable adhesive, and can each comprise a broken or separated tether 60. Pixel substrates 50 are separate, distinct, and independent of display substrate 10 or any light emitter 40 substrate or subpixel controller 30 substrate and can be adhered to display substrate 10, for example with an adhesive such as a curable adhesive. Pixel substrates 50 can be photolithographically processed (e.g., using fine lithography) to form wires on or in pixel substrates 50 to electrically interconnect the components disposed on pixel substrates 50, for example controller wires 70, first-light-emitter wire 71, and second-light-emitter wire 72. In some embodiments, pixel substrates 50 can themselves be micro-transfer printed from a source wafer to display substrate 10 and can comprise a fractured or separated tether 60. For example, in some embodiments, when a faulty first subpixel 21 is determined, a second subpixel controller 32 is disposed on or in second-subpixel-controller location 33 on pixel substrate 50 and second light emitter(s) 42 (e.g., 42R, 42G, 42B) are disposed on or in second-light-emitter location(s) 42 on pixel substrate 50.

Figure 11:
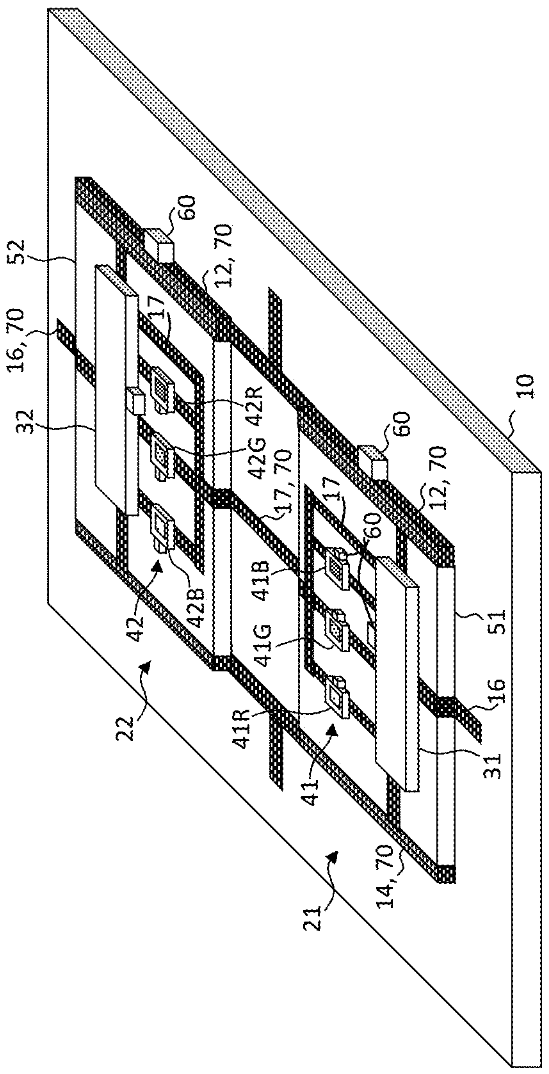
FIG. 11 is a schematic perspective of subpixels disposed on corresponding pixel substrates, according to illustrative embodiments of the present invention.

In some embodiments of the present invention, referring to FIG. 11, the redundant pixel layout 99 comprises an array of first subpixel substrates 51 disposed on or over display substrate 10 and an array of second subpixel substrates 52 disposed on or over the display substrate 10. Each first subpixel 21 is disposed on or over a corresponding first subpixel substrate 51 and each second subpixel 22 is disposed on or over a corresponding second subpixel substrate 52. Any one or all of first subpixel controllers 31 and first light emitters 41 can be micro-transfer printed from native source wafers to first subpixel substrate 51, can be adhered to first subpixel substrate 51 with an adhesive such as a curable adhesive, and can comprise a broken (e.g., fractured) or separated tether 60. Similarly, any one or all of second subpixel controllers 32 and second light emitters 42 can be micro-transfer printed from native source wafers to second subpixel substrate 52, can be adhered to second subpixel substrate 52 with an adhesive such as a curable adhesive, and can comprise a broken (e.g., fractured) or separated tether 60. Thus, first subpixel substrates 51 are separate, distinct, and independent of display substrate 10 or any first light emitter 41 substrate or first subpixel controller 31 substrate, or any second subpixel substrate 52. First subpixel substrate 51 can be photolithographically processed to form wires on or in first subpixel substrates 51 to electrically interconnect the components disposed on first subpixel substrates 51, for example controller wires 70 and first-light-emitter wire 71. Similarly, second subpixel substrates 52 are separate, distinct, and independent of display substrate 10 or any second light emitter 42 substrate or second subpixel controller 32 substrate, or any first subpixel substrate 51. Second subpixel substrate 52 can be photolithographically processed to form wires on or in second subpixel substrates 52 to electrically interconnect the components disposed on second subpixel substrates 52, for example controller wires 70 and second-light-emitter wire 72. In some embodiments, first subpixel substrates 51 and second subpixel substrates 52 can be micro-transfer printed from a same or different native source wafers to display substrate 10.

In certain embodiments, one or more of light emitters 40 and subpixel controllers 30 comprise one or more connection posts for making appropriate electrical connection to electrical connections disposed on pixel substrate 50 (if present), subpixel substrate 51, 52 (if present), or display substrate 10. In certain embodiments, one or more of first light emitters 41, second light emitters 42, first subpixel controllers 31, and second subpixel controllers 32 can comprise one or more connection posts for making appropriate electrical connection to electrical connections disposed on first subpixel substrate 51 or second subpixel substrate 52. Connections posts, methods of fabrication, and methods for making electrical connection using connections posts are described in U.S. Patent Publication No. 2017/0048976 A1, the disclosure of which is hereby incorporated by reference in it is entirety.

In some embodiments of the present invention, a pixel 20 comprising a pixel substrate 50 or first or second subpixel 21, 22 comprising first or second subpixel substrates 51, 52, respectively, further comprises one or more connection posts extending from the substrate in a direction such that when transferred onto or over a display substrate 10, the one or more connection posts extend toward display substrate 10. In this way, pixel 20 or first or second subpixel 21, 22 can be transferred (e.g., micro-transfer printed) onto display substrate 10, which comprises electrical connections (e.g., one or more of controller wires 70 (e.g., power wire 16, ground wire 17, row line 14, column line 12) and contact pads 74) such that upon transfer, pixel 20 or first or second subpixel 21, 22 becomes electrically connected through the one or more connection posts to be operable as intended. A curable adhesive can be used between pixel substrate 50 or first or second subpixel substrate 51, 52 and cured as a part of a transfer process to improve adhesion of pixel 20 or first or second subpixel 21, 22 to display substrate 10. Optionally, curing of a curable adhesive can improve or cause electrical interconnection between pixel 20 or subpixel 21, 22, respectively. First-light-emitter wire(s) 71 and second-light-emitter wire(s) 72 can be pre-patterned on pixel substrate 50 or subpixel substrate 51, 52, respectively. Use of pixels 20 comprising a pixel substrate 50 and one or more connection posts or subpixels 21, 22 comprising a first or second subpixel substrate 51, 52 and one or more connection posts can reduce or eliminate the need to photolithographically form wires after transfer of pixels 20 or first or second subpixels 21, 22 to a display substrate 10 thereby reducing manufacturing costs.

Figure 12A:
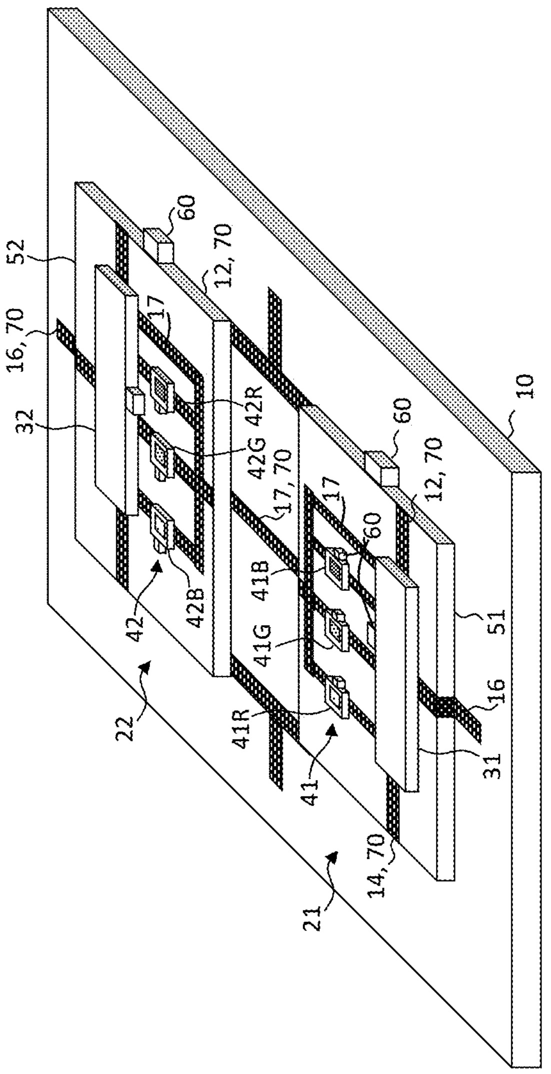
FIG. 12A is a schematic perspective of subpixels disposed on corresponding pixel substrates, according to illustrative embodiments of the present invention.
Figure 12B:
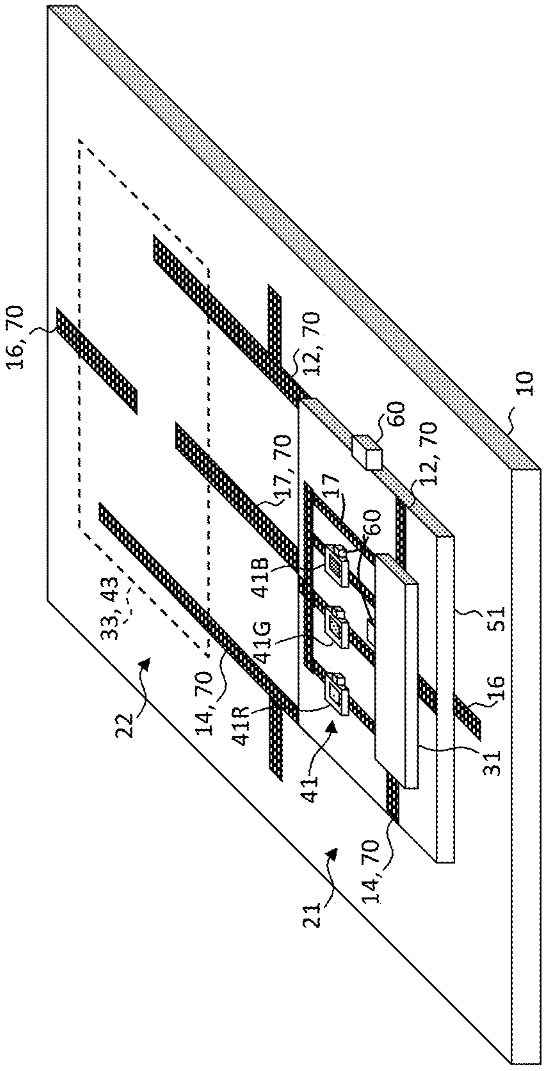
FIG. 12B is a schematic perspective of a subpixel disposed on a pixel substrate and a subpixel location, according to illustrative embodiments of the present invention.

FIG. 12A shows an illustrative embodiment in which ground wires 17, power wires 16, column wires 12, and row wires 14 are pre-patterned on display substrate 10 and first subpixel 21 comprising first subpixel substrate 51 and second subpixel 22 comprising second subpixel substrate 52 are transferred to display substrate 10 such that upon transfer, all necessary electrical connections are present and made for pixel 20 to function as intended. In this illustrative embodiment, ground wires 17, power wires 16, column wires 12, and row wires 14 are shown to run underneath first pixel substrate 51 and second subpixel substrate 52 where electrical interconnection with the wires 70 occurs through connection posts (not shown) (e.g., corresponding electrical vias through first and second pixel substrates 51, 52). FIG. 12B shows an embodiment corresponding to FIG. 12A before disposition of second subpixel substrate 52 on which second subpixel controller 32 and second light emitters 42R, 42G, 42B are disposed. Since row wires 14, column wires 12, power wires 16, and ground wires 17 are disposed on display substrate 10 in such a way that, when second subpixel substrate 52 (having the necessary elements and interconnections disposed thereon) is disposed on display substrate 10, second subpixel 22 will be operable as intended, second subpixel 22 is said to comprise a second-subpixel-controller location 33 and second-light-emitter location 43.

Figure 14:
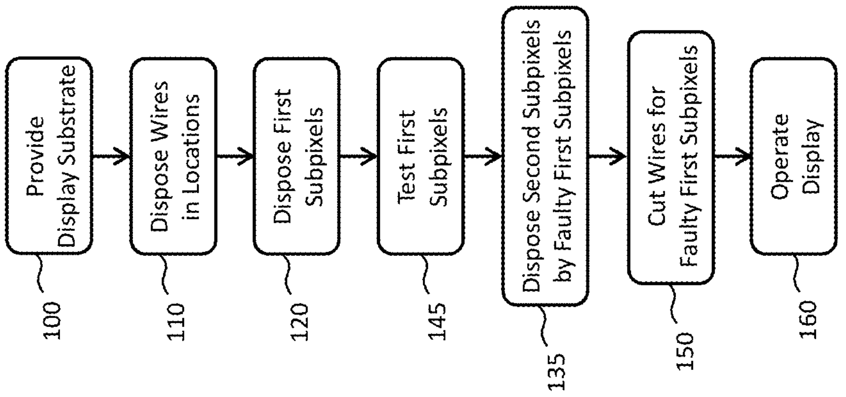
FIG. 14 is a flow chart illustrating an exemplary method, according to illustrative embodiments of the present invention.
Figure 13:
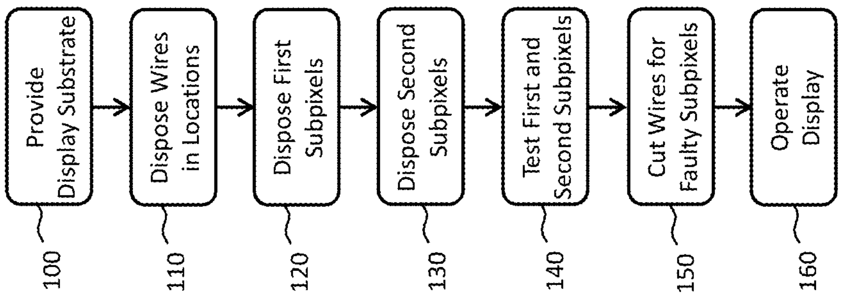
FIG. 13 is a flow chart illustrating an exemplary method, according to illustrative embodiments of the present invention.

Referring to FIGS. 13 and 14, according to some embodiments of the present invention, a method of making a redundant pixel layout 99 comprises providing a display substrate 10 in step 100 and disposing wires in locations in subpixel locations on or in display substrate 10 (e.g., controller wires 70, first-light-emitter wire 71, and second-light-emitter wire 72) in step 110. In some embodiments of the present invention, display substrate 10 is provided with the wires formed on or in the display substrate 10 so that steps 100 and 110 are a common step performed at a same time. The wires can interconnect first subpixel controllers 31 and first light emitters 41 disposed on or over display substrate 10 in step 120 as well as interconnecting electrical connections (e.g., contact pads 74) in second-subpixel-controller locations 33 and second-light-emitter locations 43.

Referring to FIG. 13, for each pixel 20 in the array of pixels, a second subpixel controller 32 electrically connected to the controller wires 70 in second-subpixel-controller location 33 and a second light emitter 42 electrically connected to second-light-emitter wire 72 in second-light-emitter location 43 is provided in step 130. Second light emitter 42 is controlled by second subpixel controller 32 at least through second-light-emitter wire 72. First and second subpixels 21, 22 in the array of pixels 20 are tested in step 140 to identify bad first subpixels 21, bad second subpixels 22, or both. In optional step 150, subpixel wires are cut to electrically isolate components in the bad first or second subpixels 21, 22, for example using a laser cutter. First subpixels 21 can each comprise a power wire 16 and a ground wire 17, as well as controller wires 70 and first-light-emitter wire 71, and at least one power wire 16, one ground wire 17, one controller wire 70, or first-light-emitter wire 71 in at least one bad first subpixel 21 can be cut. Similarly, second subpixels 22 can each comprise a power wire 16 and a ground wire 17 as well as controller wires 70 and second-light-emitter wire 72, and at least one power wire 16, one ground wire 17, one controller wire 70, or second-light-emitter wire 72 in at least one bad second subpixel 22 can be cut. Once display 98 is repaired, it can be put into operation in step 160. Generally, one or more wires to a faulty subpixel can be, but are not necessarily, cut prior to operation.

Referring to FIG. 14, first subpixels 21 in the array of pixels 20 are tested in step 145 to determine faulty first subpixels 21. For each faulty subpixel 21, a second subpixel controller 32 electrically connected to the controller wires 70 in second-subpixel-controller location 33 and a second light emitter 42 electrically connected to second-light-emitter wire 72 in second-light-emitter location 43 is provided in step 135. Second light emitter 42 is controlled by second subpixel controller 32 at least through second-light-emitter wire 72. In optional step 150, subpixel wires are cut to electrically isolate components in the bad first subpixels 21. First subpixels 21 can each comprise a power wire 16 and a ground wire 17, as well as controller wires 70 and first-light-emitter wire 71, and at least one power wire 16, one ground wire 17, one controller wire 70, or first-light-emitter wire 71 in at least one bad first subpixel 21 can be cut. Once display 98 is repaired, it can be put into operation in step 160. Generally, one or more wires to a faulty subpixel can be, but are not necessarily, cut prior to operation.

Display substrate 10 can be a printed circuit board or a glass, metal, ceramic, resin, semiconductor, quartz, sapphire, or polymer substrate. Subpixel controllers 30 or light emitters 40 can be chiplets that are micro-transfer printed onto display substrate 10. Electrically conductive row lines 14, column lines 12 can be patterned wires, conductive traces, cured conductive ink, or other electrical conductors suitable for pattern-wise conducting electricity on a substrate and can be made of copper, silver, gold, aluminum, titanium, tantalum, conductive metal, transparent conductive oxides (TCOs) such as indium tin oxide, or any other conductive material. Conductive row lines 14 or column lines 12 can be patterned and interconnected or electrically isolated over display substrate 10 using photolithographic or printed circuit board techniques. Generally, controller wires 70, whether disposed on an intermediate substrate (e.g., a pixel substrate 50 or a first or second subpixel substrate 51, 52) or a display substrate 10 can be formed lithographically. Controller wires 70 can be formed, for example, either before or after transfer of any one or combination of a pixel 20, subpixel 21, 22, subpixel controller 30, or light emitter 40. That is, one or more (e.g., all) of controller wires 70 can be disposed in some embodiments at least partially (and in some embodiments exclusively) under, over, or on a side (e.g., wrapping up onto the side) of a light emitter 40, subpixel controller 30, pixel substrate 50, or subpixel substrate 51, 52.

Pixels 20 are matrix addressed through row and column lines 14, 12 by supplying signals on the row and column lines 14, 12. Additional power wires 16 and ground wires 17 or other control signals can be provided to pixels 20 (not shown in FIG. 1). As will be clear to one of ordinary skill, wires as shown throughout the figures may only have a portion of certain wires (e.g., row and column lines 14, 12) shown for simplicity (e.g., as in FIG. 9-11, for example) with the understanding that the wire may continue beyond what is shown in order to properly electrically interconnect display 98. Column lines 12 can be controlled by a column controller 92 through a bus 18 and row lines 14 can be controlled by a row controller 94 through another bus 18. The buses 18 can be electrical buses, for example arrays of wires provided in a flexible, flat cable or rigid connectors. Row and column controllers 94, 92 can, in turn, be controlled by a system controller 96. In some embodiments, light emitters 40 are inorganic light-emitting diodes or specifically inorganic micro-light-emitting diodes.

In operation, row controller 94 and column controller 92 matrix address pixels 20 in display 98. Row controller 94 selects a row by providing a row select signal (for example a voltage or a digital signal such as a digital HIGH value or a one) on row line 14 corresponding to the row of pixels 20 that are addressed. Column controller 92 provides data on column lines 12 and the data is combined with the row select signal (for example using a digital AND gate or a voltage differential between row and column lines 14, 12) by subpixel controllers 30 to enter data into subpixel controllers 30 and cause light emitters 40 to operate and emit light. Thus, one row of pixels 20 is addressed at one time. After one row of pixels 20 are addressed, another row can be addressed in the same way, for example a neighboring row, until all of the rows have been addressed. The data provided on column lines 12 can be provided by system controller 96 through column controller 92, for example by shifting data values along a serial shift register until the data is aligned with the column of pixels 20 for which the data is intended for the selected row. System, row, and column controllers 96, 94, 92 can be digital integrated circuits with appropriate driver circuits, such as transistors, for providing electrical signals on row and column lines 14, 12.

As will be understood by those knowledgeable in the art, the terms "row" and "column" are arbitrary appellations that can be exchanged without affecting the functionality or structure of the present invention. Hence, the terms row and column can be interchanged without affecting the structure or operation of the present invention and are included in the present invention. Further, it is understood that the terms "first" and "second" as used herein throughout are arbitrary designations and any description of a "first" element or "second" element could likewise written as a corresponding description of a "second" element or "first" element, respectively.

In some embodiments of the present invention, subpixel controllers 30 or light emitters 40 can be defective (or, as used interchangeably, "faulty" or "failed"), for example having failed circuitry or failed electrical connections to controller wires 70 or first- or second-light-emitter wires 71, 72. In this context, a failure can include, for example: (i) a shorted wire or one that is overly conductive; (ii) a non-conductive wire or an electrical open; (iii) a non-reactive or non-functional subpixel controller 30 or light emitter 40; (iv) an absent subpixel controller 30 or light emitter 40 such as one that failed to print or adhere adequately to display substrate 10, pixel substrate 50, or one of first and second subpixel substrate 51, 52, or is printed to a wrong location; (v) a subpixel controller 30 or light emitter 40 with unintended output, for example the wrong brightness, light output distribution, or color; or (vi) a subpixel controller 30 or light emitter 40 that functions only intermittently. In certain embodiments, a pixel 20 or subpixel 21, 22 is tested to determine whether one or more of (i)-(vi) is true. Testing can be optical, electrical, or both optical and electrical testing.

In some embodiments of the present invention, subpixel controllers 30 or light emitters 40 are small integrated circuits, for example chiplets, having a thin substrate with a thickness of only a few microns, for example less than or equal to 25 microns, less than or equal to 15 microns, or less than or equal to 10 microns, and at least one of a width and length of between 5-1000 microns (e.g., 5-10 microns, 10-50 microns, 50-100 microns, or 100-200 microns, 200-500 microns, or 500-1000 microns). Such chiplets can be made in a source semiconductor wafer (e.g., a silicon or GaN wafer) having a process side and a back side used to handle and transport the wafer. Chiplets are formed using lithographic processes in an active layer on or in the process side of the source wafer. In certain embodiments, an empty release layer space is formed beneath the chiplets with tethers 60 connecting the chiplets to the source wafer in such a way that pressure applied against or tension applied to the chiplets breaks or separates the tethers 60 to release the chiplets from the source wafer, for example with a micro-transfer printing stamp. Methods of forming and transferring such structures are described, for example, in U.S. Pat. No. 8,889,485 the disclosure of which is incorporated by reference herein in its entirety.

Lithographic processes for forming chiplets in a source wafer, for example transistors, wires, and capacitors, can be found in the integrated circuit art. The chiplets can be constructed using foundry fabrication processes used in the art. Layers of materials can be used, including materials such as metals, oxides, nitrides and other materials used in the integrated-circuit art. Each chiplet can be a complete semiconductor integrated circuit and can include, for example, transistors. The chiplets can have different sizes, for example, 1000 square microns or 10,000 square microns, 100,000 square microns, or 1 square mm, or larger, and can have variable aspect ratios, for example 1:1, 2:1, 5:1, or 10:1. The chiplets can be rectangular or can have other shapes. In certain embodiments, electrically conducting wires, such as controller wires 70, include patterned metal layers forming contact pads 74. The contact pads 74 can be made using integrated circuit photolithographic methods.

According to some embodiments of the present invention, native source wafers can be provided with the chiplets, release layer, and tethers 60 already formed, or they can be constructed as part of a method in accordance with certain embodiments of the present invention.

The chiplets can be constructed using foundry fabrication processes used in the art. Layers of materials can be used, including materials such as metals, oxides, nitrides and other materials used in the integrated-circuit art. Each chiplet can be a complete semiconductor integrated circuit and can include, for example, transistors. The chiplets can have different sizes, for example, 1000 square microns or 10,000 square microns, 100,000 square microns, or 1 square mm, or larger, and can have variable aspect ratios, for example 1:1, 2:1, 5:1, or 10:1. The chiplets can be rectangular or can have other shapes.

A source wafer and chiplets and display substrate 10 can be made separately and at different times or in different temporal orders or locations and provided in various process states.

Matrix-addressed systems according to certain embodiments of the present invention can be constructed using display and thin-film manufacturing method independently of or in combination with micro-transfer printing methods, for example as are taught in U.S. Pat. No. 9,520,537 entitled Micro Assembled Micro LED Displays and Lighting Elements and in U.S. patent application Ser. No. 14/822,868 filed Sep. 25, 2014, entitled Compound Micro-Assembly Strategies and Devices, the contents of which are incorporated by reference herein in their entirety.

As is understood by those skilled in the art, the terms “over” and “under” are relative terms and can be interchanged in reference to different orientations of the layers, elements, and substrates included in the present invention. For example, a first layer on a second layer, in some implementations means a first layer directly on and in contact with a second layer. In other implementations a first layer on a second layer includes a first layer and a second layer with another layer therebetween.

Having described certain implementations of embodiments, it will now become apparent to one of skill in the art that other implementations incorporating the concepts of the disclosure may be used. Therefore, the disclosure should not be limited to certain implementations, but rather should be limited only by the spirit and scope of the following claims.

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as the disclosed technology remains operable. Moreover, two or more steps or actions in some circumstances can be conducted simultaneously. The invention has been described in detail with particular reference to certain embodiments thereof, but it will be understood that variations and modifications can be effected within the spirit and scope of the invention.

PARTS LIST

D direction/dimension
$D_E$ light-emitter distance
$D_P$ pixel distance
L line
L1 first line
L2 second line
10 display substrate
12 column line/column wire
14 row line/row wire
16 power wire (Vdd)
17 ground wire 18 bus
20 pixel
21 first subpixel
22 second subpixel
30 subpixel controller
31 first subpixel controller
32 second subpixel controller
33 second-subpixel-controller location
40 light emitter
40R red light emitter
40G green light emitter
40B blue light emitter
41 first light emitter
41R red first light emitter
41G green first light emitter
41B blue first light emitter
42 second light emitter
42R red second light emitter
42G green second light emitter
42B blue second light emitter
43 second-light-emitter location
43R red second-light-emitter location
43G green second-light-emitter location
43B blue second-light-emitter location
50 pixel substrate
51 first subpixel substrate
52 second subpixel substrate
60 tether
70 controller wire
71 first-light-emitter wire
72 second-light-emitter wire
74 contact pad
92 column controller
94 row controller
96 system controller
98 display
99 redundant pixel layout
100 provide display substrate step
110 dispose wires in locations step
120 dispose first subpixels step
130 dispose second subpixels step
135 dispose second subpixels for faulty first subpixels step
140 test first and second subpixels step
145 test first subpixels step
150 cut wires for faulty subpixels step
160 operate display step

The invention claimed is:

1. A redundant pixel layout for a display, comprising:

a display substrate; and an array of pixels disposed on or over the display substrate, each of the pixels comprising a first subpixel comprising a first subpixel controller comprising a transistor, the first subpixel controller electrically connected to controller wires, and first light emitters electrically connected to first-light-emitter wires, the first light emitters controlled by the first subpixel controller at least through the first-light-emitter wires, wherein the first light emitters and the first subpixel controller each have a substrate separate and independent of the display substrate and each other and are disposed on a common surface of the display substrate, a second subpixel comprising (i) a second-subpixel-controller location comprising electrical connections to the controller wires arranged to electrically connect a second subpixel controller comprising a transistor when the second subpixel controller is provided on the common surface of the display substrate and (ii) second-light-emitter locations, each comprising a second-light-emitter wire different from the first-light-emitter wires, electrically connected to the second-subpixel-controller location, and arranged to electrically connect second light emitters when the second light emitters are provided on the common surface of the display substrate, each of the second-light-emitter locations corresponding to a second light emitter that emits light of a same color as one of the first light emitters and of a different color from each other of the second light emitters, wherein the second subpixel is redundant to the first subpixel, wherein one of the first light emitters is adjacent to one of the second-light-emitter locations and the one of the first light emitters and the one of the second-light-emitter locations are closer together than are any two first light emitters in different pixels in the array of pixels and are closer together than any first light emitter and second-light-emitter location in different pixels in the array of pixels, and wherein neither the first sub-pixel controller nor the second sub-pixel-controller location is disposed between any of the first light emitters, between any of the second light-emitter locations, or between any first light emitter and any second light-emitter location in a pixel.

2. The redundant pixel layout of claim 1, wherein the second subpixel of at least one pixel in the array of pixels comprises (i) a second subpixel controller comprising a transistor, the second subpixel controller electrically connected to the controller wires in the second-subpixel-controller location, and (ii) a second light emitter electrically connected to the second-light-emitter wire in one of the second-light-emitter locations, wherein the second light emitter is controlled by the second subpixel controller at least through the second-light-emitter wire.

3. The redundant pixel layout of claim 2, wherein, for at least one of the pixels, (i) the first subpixel controller has an area that is greater than the combined areas of the first light emitters, (ii) the second subpixel controller has an area that is greater than the combined areas of the second light emitters, or (iii) both (i) and (ii).

4. The redundant pixel layout of claim 2, wherein, for at least one of the pixels, one of the first light emitters is between the first subpixel controller and the second light emitter and the second light emitter is between the second subpixel controller and the first light emitter.

5. The redundant pixel layout of claim 2, wherein, for the at least one pixel, the first subpixel controller is adjacent to the second subpixel controller.

6. The redundant pixel layout of claim 2, wherein, for the at least one pixel, the second subpixel is disposed in a rotated arrangement with respect to the first subpixel, wherein the rotation is 45 degrees, 90 degrees, 135 degrees, 225 degrees, 270 degrees, or 315 degrees.

7. The redundant pixel layout of claim 2, wherein, for the at least one pixel, (i) the first subpixel controller has an area that is greater than an area of each of the first light emitters, (ii) the second subpixel controller has an area that is greater than an area of the second light emitter, or (iii) both (i) and (ii).

8. The redundant pixel layout of claim 2, comprising an array of pixel substrates disposed on or over the display substrate, and wherein each of the pixels is disposed on or over a corresponding one of the pixel substrates that is separate, distinct, and independent of the display substrate and any other of the pixel substrates, the first subpixel controller and the first light emitter of each of the pixels each comprise a broken or separated tether, and for the at least one pixel, the second subpixel controller has at least one of a width and a length of 5-200 microns and the second subpixel controller and the second light emitter each comprise a broken or separated tether.

9. The redundant pixel layout of claim 2, comprising an array of first subpixel substrates disposed on or over the display substrate and an array of second subpixel substrates disposed on or over the display substrate, wherein each of the first subpixel substrates and each of the second subpixel substrates is separate, distinct, and independent of the display substrate and any other of the first pixel substrates and the second subpixel substrates, and wherein each first subpixel is disposed on or over a corresponding first subpixel substrate, each second subpixel is disposed on or over a corresponding second subpixel substrate, any one or more of the first subpixel substrates, the second subpixel substrates, the first subpixel controllers and the first light emitters each comprise a broken or separated tether, and for the at least one pixel, the second subpixel controller has at least one of a width and a length of 5-200 microns and the second subpixel controllers, and the second light emitters each comprise a broken or separated tether.

10. The redundant pixel layout of claim 2, wherein the first subpixel controller and the second subpixel controller are provided with separate substrates, are electronic circuits, are silicon circuits, are integrated circuits, are chiplets, or are unpackaged die.

11. The redundant pixel layout of claim 2, wherein at least one of the first subpixel controller and the second sub-pixel controller comprises an integrated circuit.

12. The redundant pixel layout of claim 2, wherein both the first subpixel controller and the second sub-pixel controller comprises an integrated circuit.

13. The redundant pixel layout of claim 1, wherein, for at least one of the pixels, the first light emitters are adjacent and the second light emitter locations are adjacent.

14. The redundant pixel layout of claim 1, wherein, for at least one of the pixels, all of the first light emitters and the second light emitter locations are disposed in a common line.

15. The redundant pixel layout of claim 1, wherein, for at least one of the pixels, the first light emitters are disposed in a first line and the second light emitter locations are disposed in a second line different from the first line.

16. The redundant pixel layout of claim 1, wherein, for at least one of the pixels, the first light emitters are adjacent to the second light emitter locations.

17. The redundant pixel layout of claim 1, wherein, for at least one of the pixels, the first light emitters are interdigitated with the second light emitter locations in a line.

18. The redundant pixel layout of claim 1, wherein, for at least one of the pixels, the first subpixel comprises a red first light emitter that emits red light, a green first light emitter that emits green light, and a blue first light emitter that emits blue light, and the second subpixel comprises a red second light emitter that emits red light, a green second light emitter that emits green light, and a blue second light emitter that emits blue light.

19. The redundant pixel layout of claim 18, wherein the red first light emitter is adjacent to the blue second light emitter, the green first light emitter is adjacent to the green second light emitter, and the blue first light emitter is adjacent to the red second light emitter.

20. The redundant pixel layout of claim 18, wherein the red first light emitter is adjacent to the red second light emitter, the green first light emitter is adjacent to the green second light emitter, and the blue first light emitter is adjacent to the blue second light emitter.

21. The redundant pixel layout of claim 1, wherein no other light emitter or subpixel controller in the first subpixel is closer to one of the second-light-emitter locations than one of the first light emitters.

22. The redundant pixel layout of claim 1, wherein one of the first light emitters emits light of a first color and one of the second-light-emitter locations is for a second light emitter that emits light of a second color different from the first color and wherein the one of the first light emitters is adjacent to the one of the second-light-emitter locations and the one of the first light emitters and the one of the second-light-emitter locations are closer together than are any light emitters in two different pixels in the array of pixels.

23. A redundant pixel layout for a display, comprising:

a display substrate; and an array of pixels disposed on or over the display substrate, each pixel comprising a first subpixel comprising (i) a first subpixel controller comprising a transistor, the first subpixel controller electrically connected to controller wires, and (ii) one or more first light emitters each electrically connected to a first-light-emitter wire, each of the one or more first light emitters controlled by the first subpixel controller at least through the first-light-emitter wire, wherein the one or more first light emitters and the first subpixel controller each have a substrate separate and independent of the display substrate and each other and are disposed on a common surface of the display substrate, a second subpixel comprising (i) a second-subpixel-controller location comprising electrical connections to the controller wires that are arranged to electrically connect a second subpixel controller comprising a transistor when the second subpixel controller is provided on the common surface of the display substrate and (ii) one or more second-light-emitter locations each comprising a second-light-emitter wire electrically connected to the second-subpixel-controller location and arranged to electrically connect a second light emitter when the second light emitter is provided on the common surface of the display substrate, each of the one or more second-light-emitter locations corresponding to a second light emitter that emits light of a same color as one of the first light emitters, wherein the second subpixel is redundant to the first subpixel, wherein at least one of the first sub-pixel controller and the second sub-pixel controller location is not disposed between any of the one or more first light emitters, between any of the one or more second light emitter locations in the pixel, or between any one of the one or more first light emitters and any one of the one or more second light-emitter locations.

* * * * *